(12) United States Patent
Takayama et al.

(10) Patent No.: US 8,563,165 B2
(45) Date of Patent: Oct. 22, 2013

(54) ASSEMBLED BATTERY

(75) Inventors: Gen Takayama, Fujisawa (JP); Hiroaki Kishimoto, Sagamihara (JP); Youji Murakami, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1826 days.

(21) Appl. No.: 11/399,696

(22) Filed: Apr. 6, 2006

(65) Prior Publication Data

US 2006/0246350 A1 Nov. 2, 2006

(30) Foreign Application Priority Data

Apr. 7, 2005 (JP) .................................. 2005-111097
Feb. 8, 2006 (JP) .................................. 2006-031695

(51) Int. Cl.
*H01M 2/06* (2006.01)

(52) U.S. Cl.
USPC ........... 429/178; 429/149; 429/153; 429/160; 29/623.2

(58) Field of Classification Search
None
See application file for complete search history.

(56) References Cited

U.S. PATENT DOCUMENTS

| 478,485 | A | 7/1892 | Waldron |
| 3,094,438 | A | 6/1963 | Daley et al. |
| 3,563,804 | A | 2/1971 | Garcin et al. |
| 4,734,341 | A | 3/1988 | Descroix et al. |
| 5,871,861 | A | 2/1999 | Hirokou et al. |
| 6,358,641 | B1 * | 3/2002 | Mease .............................. 429/34 |
| 6,451,474 | B1 * | 9/2002 | Kozu et al. ..................... 429/100 |
| 2002/0102453 | A1 * | 8/2002 | Suenaga et al. .................. 429/37 |
| 2002/0122978 | A1 * | 9/2002 | Setliff ............................. 429/178 |
| 2005/0123828 | A1 * | 6/2005 | Oogami et al. ................ 429/152 |
| 2005/0221177 | A1 * | 10/2005 | Amagai et al. ................. 429/186 |

FOREIGN PATENT DOCUMENTS

| GB | 2 176 929 | * | 1/1987 | ............. H01M 6/46 |
| GB | 2 176 929 A | | 1/1987 | |
| JP | 2001-345082 | | 12/2001 | |
| JP | 2005116444 | | 4/2005 | |

OTHER PUBLICATIONS

European Patent Application No. 06251976.4 Search Report dated Sep. 1, 2006.

* cited by examiner

*Primary Examiner* — Ula C. Ruddock
*Assistant Examiner* — Alix Echelmeyer
(74) *Attorney, Agent, or Firm* — Young Basile

(57) ABSTRACT

The disclosure is directed to an assembled battery that includes a plurality of battery modules and unit cells. The unit cells of each battery module are electrically connected through a plurality of collars placed around a shaft member that secures the battery modules. The shaft member may also electrically connect the unit cells in some embodiments. In other embodiments, axial force from the securing shaft member deforms the collars to create the electrical connections. Alternative embodiments include engagement members secure the battery modules in order to eliminate the need for axial force from a shaft member to complete the assembled battery.

27 Claims, 37 Drawing Sheets

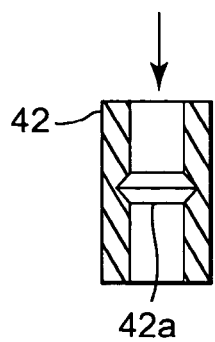 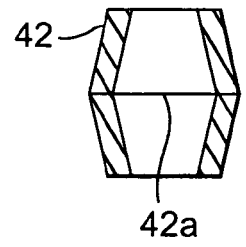
Fig. 7A     Fig. 7B
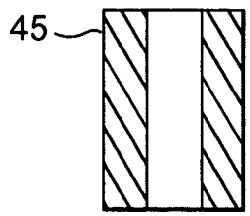
Fig. 7C
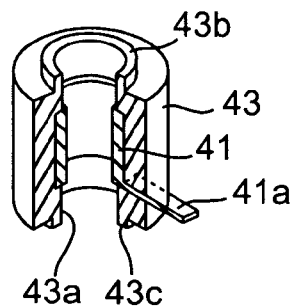
Fig. 8A
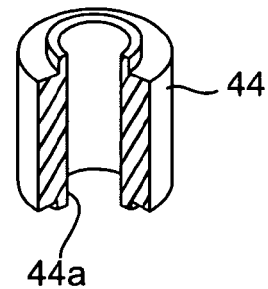
Fig. 8B

US 8,563,165 B2

ASSEMBLED BATTERY

This application claims priority to Japanese Patent Application No. 2006-031695, filed Feb. 8, 2006, and Japanese Patent Application No. 2005-111097, filed Apr. 7, 2005, the entire contents of each of which is incorporated herein by reference.

TECHNICAL FIELD

The invention relates to a battery module and an assembled battery.

BACKGROUND

High output and high capacity assembled batteries are typically produced by arranging and electrically connecting more than one battery module in series and/or in parallel. Multiple electrically conductive bus bars are locked to electrode terminals by bolts in order to electrically connect the electrode terminals of the battery modules of an assembled battery. Each of the battery modules includes one or more unit cells, where the unit cells are electrically connected within a housing of the battery module. Battery modules may be placed next to each other and also stacked in layers to produce one assembled battery. These assembled batteries may be used in individual or commercial applications such as motor vehicles including airplanes, automobiles and marine vehicles.

SUMMARY

In general, the invention is directed to an assembled battery that includes a plurality of battery modules and unit cells. The unit cells of each battery module are electrically connected to each other, to external terminals, and other battery modules through a plurality of collars placed around a shaft member that secures the battery modules. The shaft member may electrically connect the unit cells in some embodiments, and a sleeve may insulate the collars from the shaft in embodiments where electrical connections do not include the shaft member. Axial force from the securing shaft member deforms the collars to create the electrical connections. Alternative embodiments include engagement members secured to the battery modules in order to eliminate the need for axial force from a shaft member to complete the assembled battery.

Securing or tightening each bus bar to the electrode terminals by bolts of an assembled battery increases system complexity and requires more time during manufacturing. The object of the present invention is to provide a battery module and an assembled battery that allows simplified operations to establish secure electrical connections.

In one embodiment, the invention is directed to a battery module including a housing containing a plurality of unit cells having electrical terminals, a shaft member inserted through the housing, and a collar placed around the shaft member, wherein the collar is electrically connected to at least one of the electrical terminals of the unit cells.

In another embodiment, the invention is directed to an assembled battery including a plurality of battery modules. Each battery module includes a housing containing a plurality of unit cells having electrical terminals, a shaft member inserted through the housing, and a collar placed around the shaft member, wherein the collar is electrically connected to at least one of the electrical terminals of the unit cells.

In an additional embodiment, the invention is directed to a method for assembly of a battery module including stacking a plurality of unit cells within a housing to place a plurality of terminals of the unit cells adjacent to a plurality of collars located within the first housing, wherein at least one of the plurality of collars electrically connects the terminals of the unit cells to an external terminal for electrical connecting a second battery module, and inserting a shaft member through the housing and the plurality of collars.

In an alternative embodiment, the invention is directed to a battery module including a plurality of unit cells having electrical terminals, means for containing the plurality of unit cells, means for electrically connecting at least one of the plurality of unit cells to an external terminal, and means for securing the electrically coupling means.

The disclosure may provide one or more advantages. Electrically connecting unit cells with collars may facilitate battery assembly, and utilizing deformable collars allows the connections to be made during the securing of the shaft member. Additionally, the shaft member may be electrically insulated from the collars to allow a greater number of stacked battery modules. Further, engagement parts may be employed to eliminate the need for the shaft member to provide axial force for securing the battery modules.

In some embodiments, oxidation film may be removed from unit cell terminals during the deformation of collars when the shaft member is secured. Removing any oxidation may reduce impedance to current flow in the electrical connections.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 7A and 7B are cross section drawings of a conductive collar opened to be deformed as shown in FIGS. 2 and 3.

FIG. 7C is a cross section of the insulation collar shown in FIGS. 2 and 3.

FIGS. 8A and 8B are partially broken perspective views of the sleeve shown in FIGS. 2 and 3.

DETAILED DESCRIPTION

Figure 1:
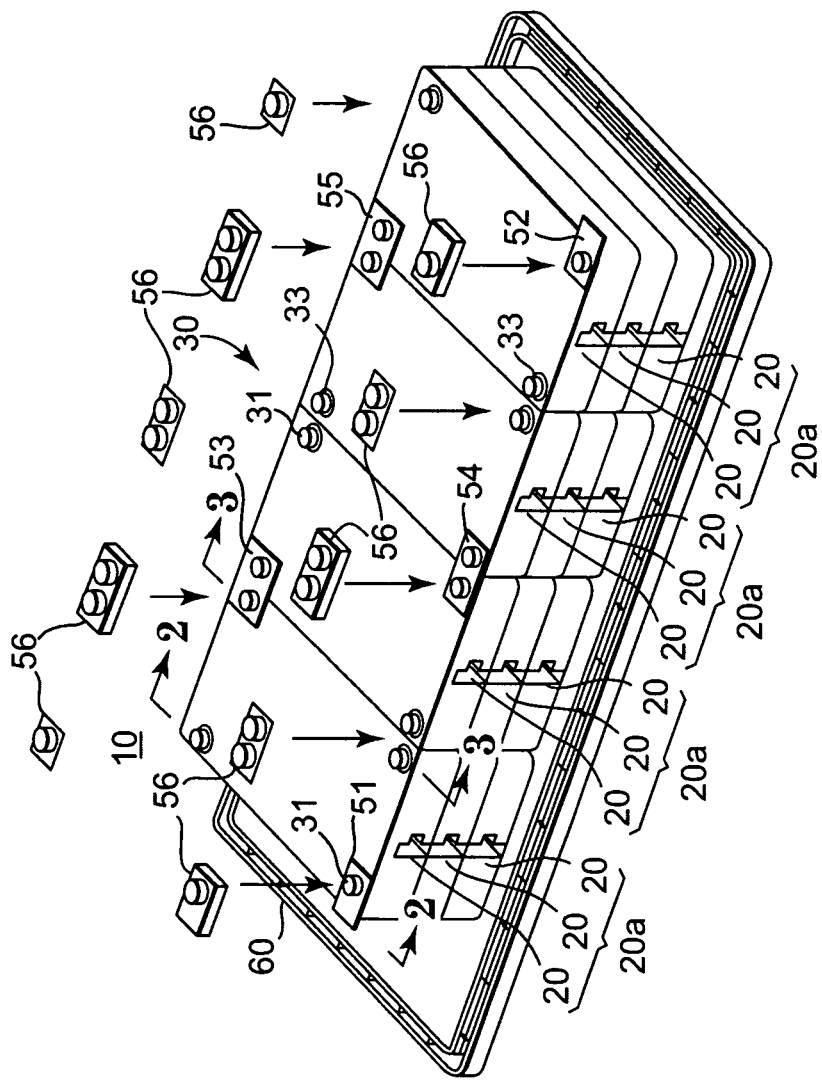
FIG. 1 is a perspective view illustrating an assembled battery related to embodiment 1.
Figure 2:
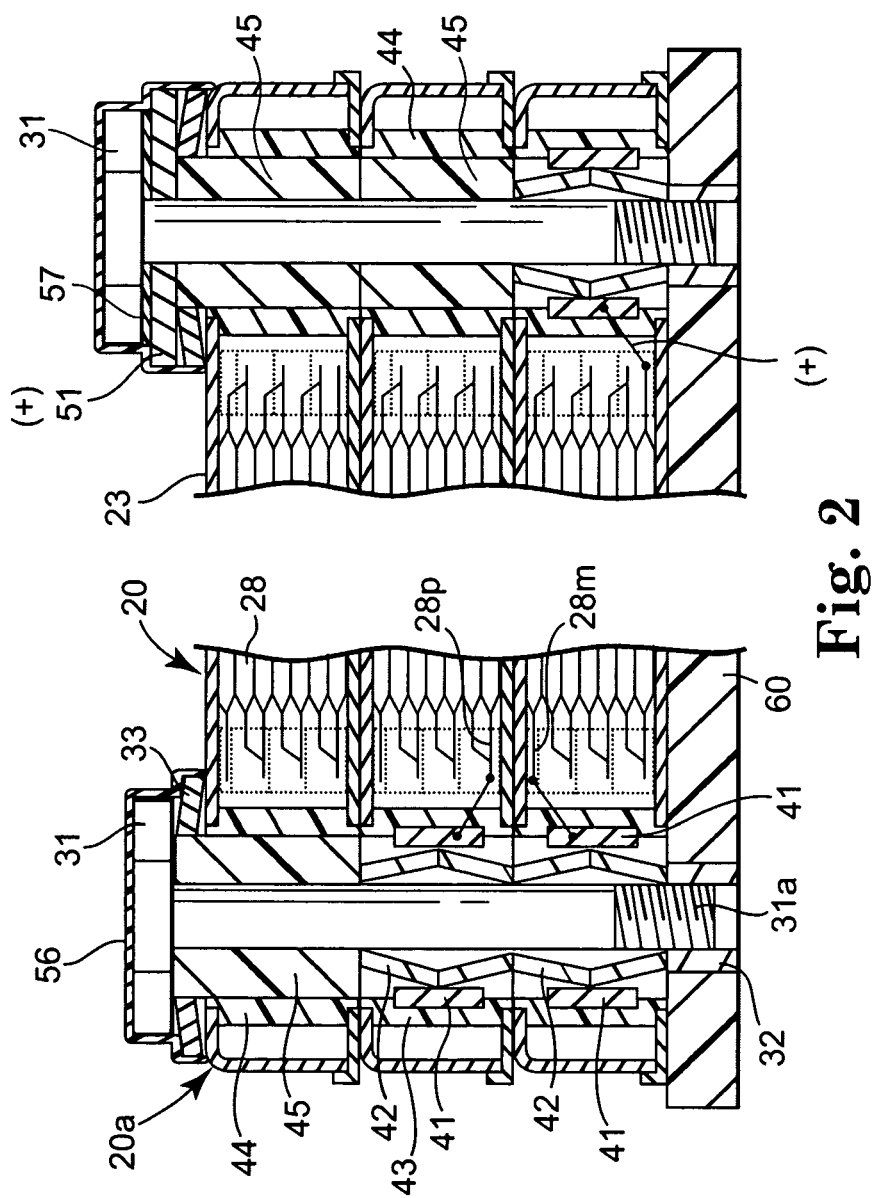
FIG. 2 is a cross section view along the 2-2 line in FIG. 1.
Figure 3:
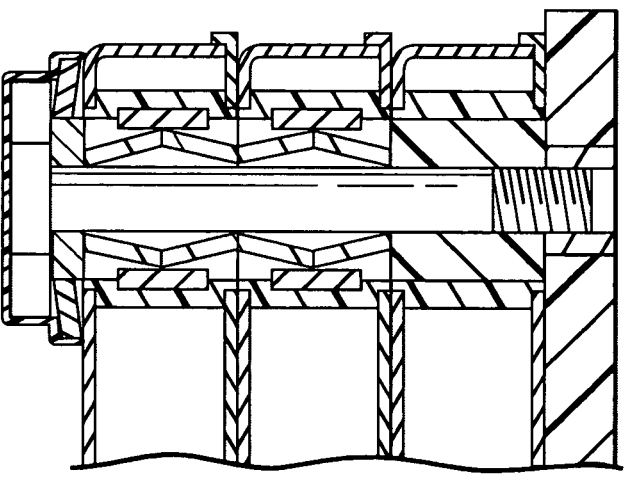
FIG. 3 is a cross section view along the 3-3 line in FIG. 1.
Figure 3:
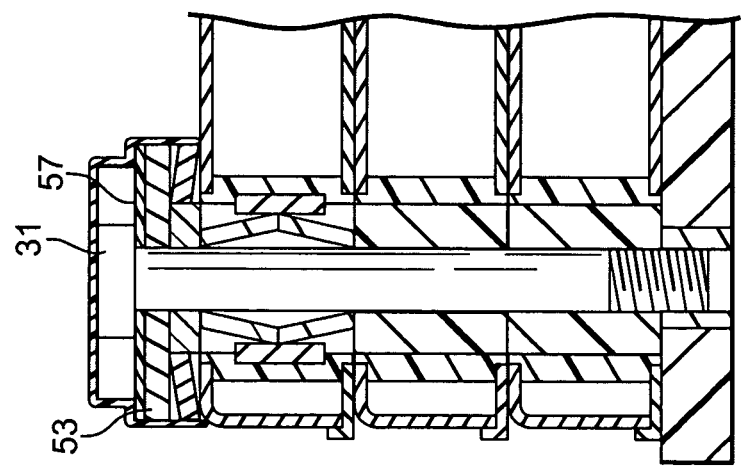
Figure 4:
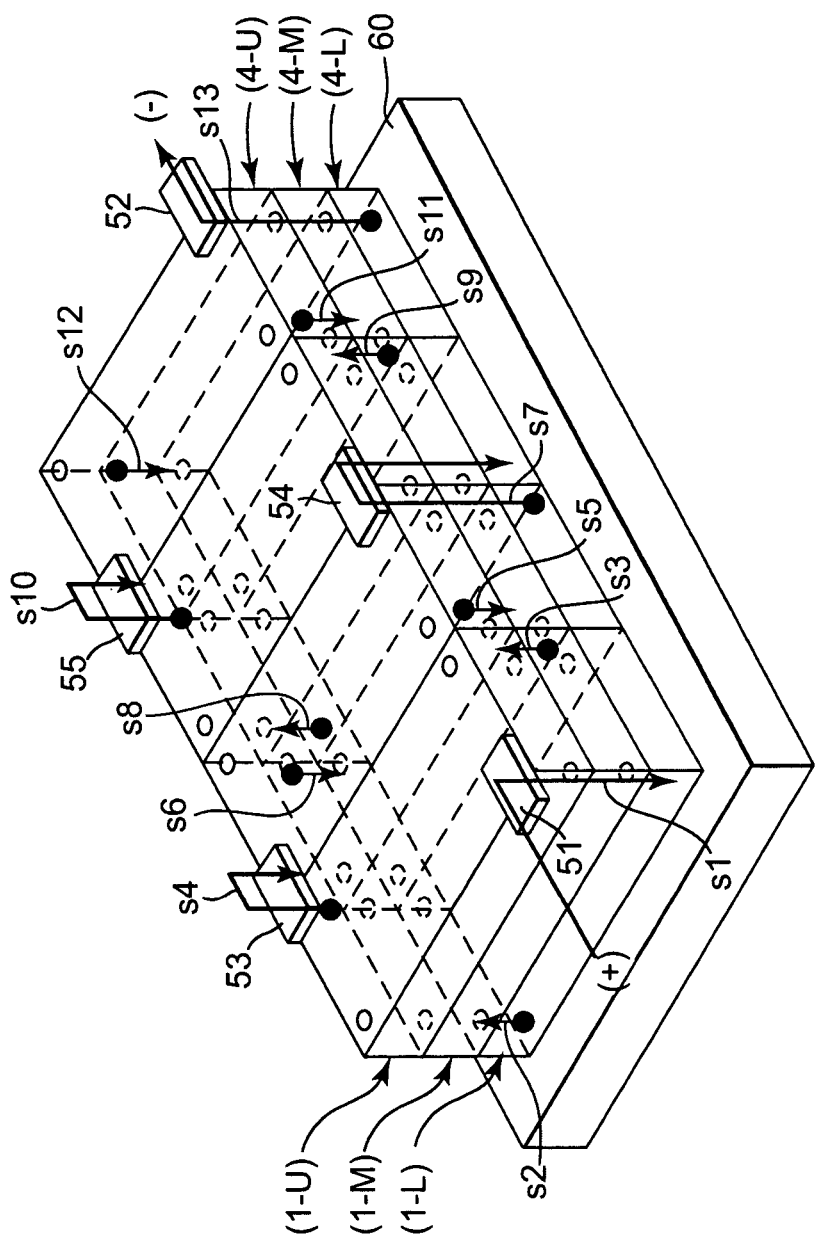
FIG. 4 is a perspective view conceptually illustrating an electrically connected state of an assembled battery.
Figure 5:
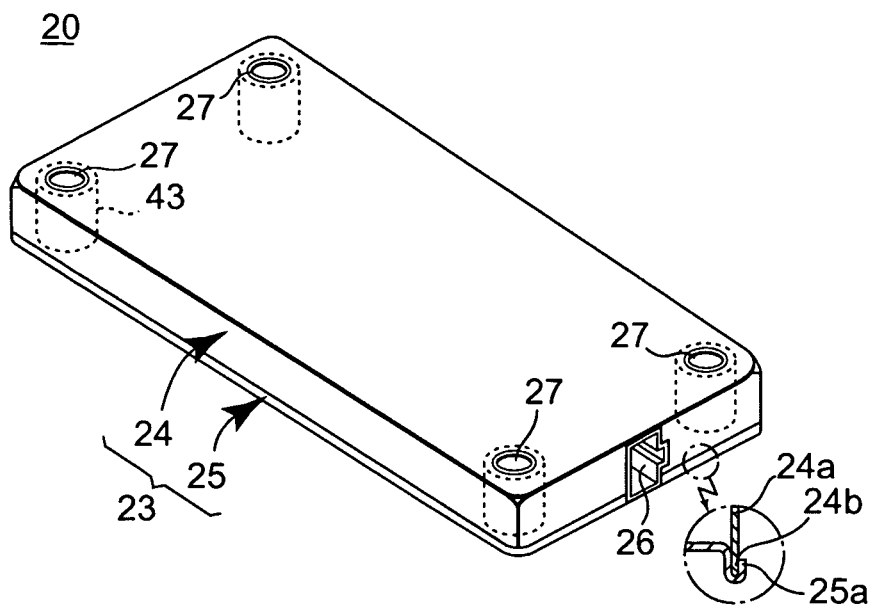
FIG. 5 is a perspective view illustrating one example of a battery module of an assembled battery.
Figure 6:
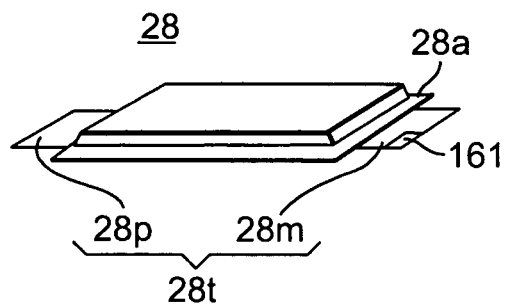
FIG. 6 is a perspective view illustrating one example of a flat type battery, or unit cell, within a battery module.
Figure 9:
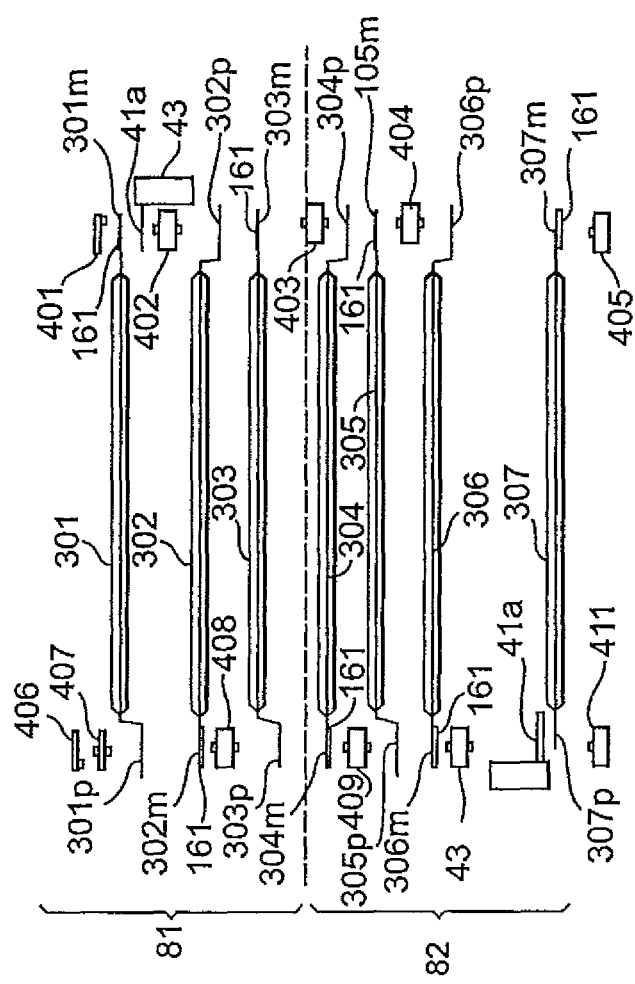
FIG. 9 is a conceptual view of layering the flat-type batteries and spacers in a battery module.
Figure 10:
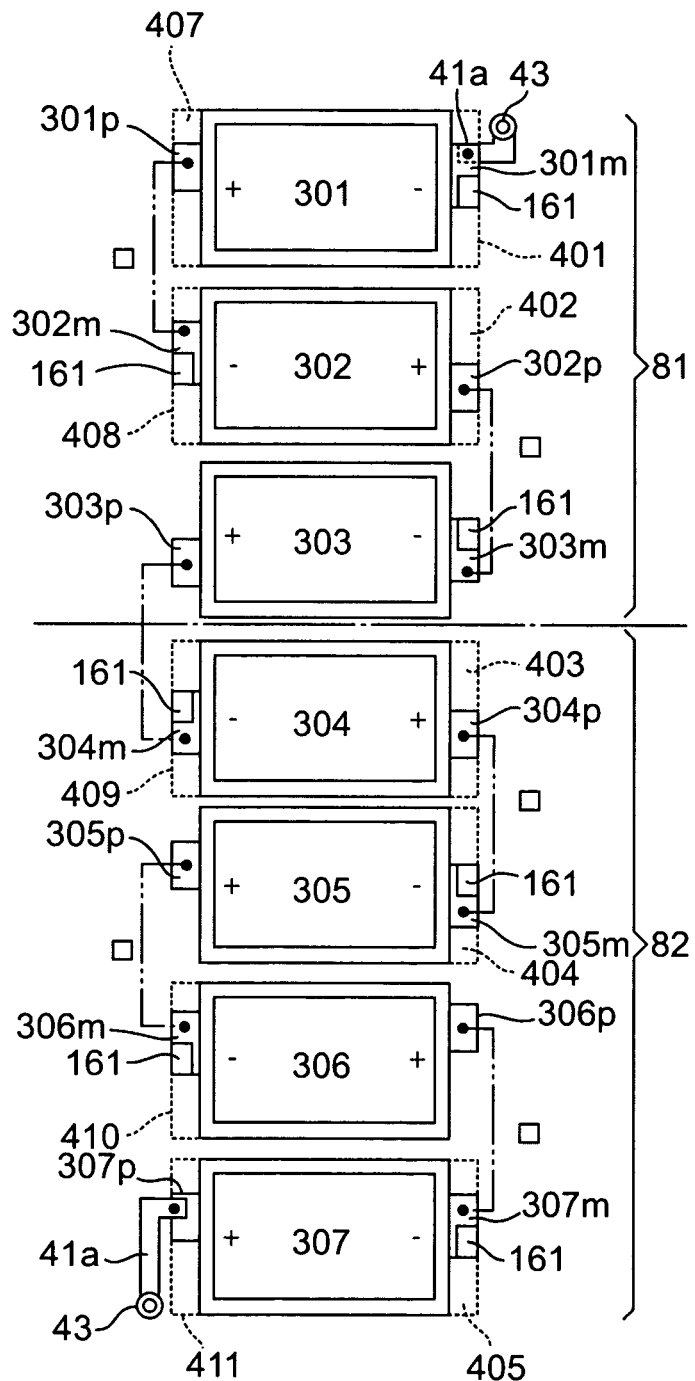
FIG. 10 is a conceptual view of electrical connection conditions of the flat-type batteries in a battery module.

FIG. 1 is a perspective view illustrating an assembled battery 10 related to embodiment 1 of the present invention. FIGS. 2-17 are also related to embodiment 1. FIG. 2 is a cross-section view along the 2-2 line in FIG. 1. FIG. 3 is a cross-section view along the 3-3 line in FIG. 1. FIG. 4 is a perspective view conceptually illustrating an electrically connected state of an assembled battery 10, and FIG. 5 is a perspective view illustrating a battery module 20 that makes up assembled battery 10. FIG. 6 is a perspective view illustrating an example of flat type battery 28 that is accommodated in battery module 20. FIGS. 7A and B are cross-section drawings of conductive collar 42, i.e. a deformation member, opened to be deformed as shown in FIGS. 2 and 3. The collar may also be an electrically connecting means. FIG. 7C is a cross-section view of insulation collar 45 as shown in FIGS. 2 and 3. FIGS. 8A and B are partially broken perspective views of sleeves 43 and 44 shown in FIGS. 2 and 3. FIG. 9 is a conceptual view illustrating layers of flat type batteries and the spacers in battery module 20. FIG. 10 is a conceptual view illustrating the electrical connection of flat type batteries in battery module 20. FIGS. 11-14 are schematic process charts illustrating the production of assembled battery 10. FIG. 15 is a perspective view illustrating an assembling jig to produce battery module 20, and FIGS. 16 and 17 are schematic process charts illustrating the production of battery module 20.

Referring to FIG. 1, assembled battery 10 is an on-board battery, to be installed in vehicles such as automobiles or trains, accommodating a plurality of battery modules 20 stacked in layers. Although not illustrated, more than one of battery modules 20 are housed in a housing of the assembled battery, and an inlet duct to introduce cooling air and an outlet duct to emit the cooling air are connected to the assembled battery housing.

Assembled battery 10, which may be compatible with an applicable current, voltage, and capacity, is realized by the serial-parallel connection of a plurality of battery modules 20. The illustrated assembled battery 10 includes twelve battery modules 20 that are electrically connected in series. The 12 battery modules 20 shown in FIG. 1 are divided into battery module groups 20a consisting of three vertically stacked battery modules arranged in four horizontal rows.

Briefly, referring to FIGS. 2 and 3, battery module 20 of embodiment 1 has a flat type battery 28, i.e. a unit cell, module case 23, i.e. a battery module housing (means for containing the plurality of unit cells), accommodating flat type battery 28. Through-bolt 31, i.e. a shaft member or securing means, is inserted through the housing, and conductive collar 42, i.e. a collar, is placed around through-bolt 31 coaxially as well as electrically connected to external terminals 51-55 or other battery modules 20. Collar 42 is also electrically connected to terminal 41, which is placed adjacent to conductive collar 42 and electrically connects flat type battery 28 to conductive collar 42. Conductive collar 42 is electrically connected to through-bolt 31 by contact with through-bolt 31. In this manner, flat type battery 28 is electrically connected to external terminals 51-55 or other battery modules 20 by contacting conductive collar 42 and through-bolt 31.

Referring FIG. 5, module housing, or case, 23 includes a box-shaped first housing 24 with a prepared opening, and a second housing 25 comprising a lid body to close the opening. By a caulking process, edge 25a of second housing 25 is tightened and wound around edge 24b of surrounding wall 24a of first housing 24 (see the enlarged view within FIG. 5). First housing 24 and second housing 25 are made of a thin steel plate or of an aluminum plate on which a predetermined shape is created with a pressing process. Plug slot 26 accepts a plug connector (not shown) that may detect voltage of battery module 20. Voltage detection is conducted for the purpose of managing charge and discharge of battery modules 20. Moreover, bolt hole 27 accepts insertion of through-bolt 31 into module housing 23. Bolt holes 27 are formed to be paired up between first housing 24 and second housing 25. Bolt holes 27 are located in four locations proximal to the four corners of module housing 23.

Through-bolt 31 is inserted into each of three battery modules 20 in a direction parallel to battery modules 20 stacked in layers (vertical directions in FIGS. 2 and 3) through bolt hole 27. Through-bolt 31 is made from an electrically conductive material such as metal or metal alloy. Four through-bolts 31 are inserted into one battery module 20.

Referring to FIG. 6, the flat type battery 28 is, for example, a flat lithium-ion secondary battery in which superimposing type power generating elements (not illustrated in FIG. 6) consisting of a cathode electrode plate, an anode electrode plate, and a separator are stacked in layers. Flat type battery 28 is sealed by exterior material 28*a*, such as laminated film. Flat type battery 28 will be referred to as a "battery," hereafter. Regarding battery 28, tabs 28*t*, including cathode tab 28*p* and anode tab 28*m*, are plate shaped with one end electrically connected to the power generating elements. Tabs 28*t* are led outside of exterior material 28*a*. Tabs 28*t* extend to both sides in a longitudinal direction of battery 28. With regard to battery 28 including superimposing type power generating elements, pressure may be applied to secure and press the power generating elements in order to maintain battery performance. Performance is maintained by keeping an even distance between the electrode plates. Thus, battery 28 is housed in module housing 23 such that the power generating elements are compressed. Voltage-detecting terminal board 161 is bonded over anode tab 28*m*. Voltage-detecting terminal board 161 is connected to a connector terminal to detect voltage. In embodiment 1, seven batteries 28 are connected in series to form a battery module 20.

As shown in FIGS. 2, 3 and 7B, conductive collar 42 is cylindrically shaped to allow insertion of through-bolt 31. The diameter of the outside cylinder of collar 42 is wider near the approximate center height position than the diameter of either end of the collar. Conductive collar 42 is placed around through-bolt 31 coaxially by insertion of through-bolt 31. Conductive collar 42 is made from an electrically conductive material such as metallic materials. Conductive collar 42 is electrically connected to through-bolt 31 by an opening end of the conductive collar contacting the outer surface of through-bolt 31. One battery module 20 accommodates only one unit cell which is established by connecting more than one of the batteries. Therefore, one battery module 20 requires two conductive collars 42 for a cathode and an anode. Two conductive collars 42 are placed coaxially around two through-bolts 31 of the four through-bolts 31 inserted into one battery module 20. Insulation collar 45 is placed around the two through-bolts 31 coaxially. As illustrated in FIG. 7C, insulation collar 45 is cylindrically shaped to allow insertion of through-bolt 31. Insulation collar 45 is made from electrically insulated materials such as resin materials or polymers. Referring to FIGS. 2 and 3 together, the positions of through-bolts 31 within conductive collars 42 are different in each battery module 20. This difference occurs in order to create a desired electrical connection between the battery modules.

As shown in FIG. 7A, regarding conductive collar 42, notches 42*a* are formed around the circumference within the inner circumference surface at an approximate center position in the axial direction. By the axial force provided from through-bolt 31 when securing battery module 20, the axial force shown by an arrow (FIG. 7A), concentrates stress on notches 42*a* and conductive collar 42 is buckled at the point of the notches 42*a* and deformed (FIG. 7B) in the direction perpendicular to the axial direction of through-bolt 31. As a result of having been deformed, conductive collar 42 is pressed against terminal 41 and establishes an electrical connection with through-bolt 31. Conductive collar 42 is opened to be deformed while rubbing the surface of output terminal 41. Because of this, oxidized coatings formed on the surface of output terminal 41 that could provide electrical resistance are removed, and less resistive electrical connections may be established. Furthermore, since buckled conductive collar 42 possesses a spring effect in the direction of the deformation, contact failures attributed to material changes over time or vibrations may be avoided. Moreover, since conductive collar 42 is deformed in the direction perpendicular to the axial direction of through-bolt 31, a centering effect is created. Therefore, as through-bolt 31 is tightened, the through-bolt also becomes effective in positioning battery modules 20 in accordance with the through-bolt 31.

As illustrated in FIG. 8A, terminal 41 is cylindrically shaped to allow insertion of through-bolt 31. Terminal 41 is made from electrically conductive materials such as metallic materials. Terminal 41 is inserted into a hollow cylindrically shaped sleeve 43, i.e. an insulation sleeve, that is made from electrically insulated materials such as resin or polymer materials. In module housing 23, terminal 41 can be arranged inside the module housing by arranging sleeve 43 between the upper and the bottom bolt holes 27. Regarding terminal 41, the inner circumferential surface is exposed to center hole 43*a* of sleeve 43, and electrode part 41*a* is led outside from the outer circumference surface of sleeve 43. Electrode part 41*a* is attached to tab 28*t* of battery 28 by ultrasonic welding to connect terminal 41 to battery 28 electrically. By having contact with conductive collar 42, terminal 41 connects battery 28 to conductive collar 42 electrically. One battery module 20 requires two terminals 41, for a cathode and an anode.

In the upper end, or first end, and bottom end, or second end, of sleeve 43, projecting ribs 43*b* and 43*c*, or cylindrical indentations, are fitted into bolt holes 27. With regard to sleeve 43, a relative position between first housing 24 and second housing 25 can be determined when rim 25*a* of second housing 25 is wound to be tightened to rim 24*b* of first housing 24 by fitting each rib 43*b* and 43*c* into bolt holes 27. Therefore, in the case of assembling battery modules 20, an exclusive jig for the positioning required for determining the relative position between both housings 24 and 25 may not be needed.

A sleeve 44, i.e. an insulation sleeve, equipped with terminal 41 (see FIG. 8B) is placed around insulation collar 45. Insulation collar 45 is placed where no electrical connection is to be established. Sleeve 43 equipped with a terminal 41 may be used for the purpose of commoditizing parts, even for a part in which electrical connections are not required.

Referring to FIGS. 9 and 10, a battery module includes seven batteries 301-307 and insulation spacers 401-411 to secure tabs. For convenience of illustration, the seven batteries are called as first battery 301 through seventh battery 307 from top to bottom along the battery layer direction (vertical direction in FIG. 9). In FIG. 10, spacers 401-411 are shown as broken lines.

Cell units, within battery modules, are composed of two subassemblies, the first subassembly 81 and the second subassembly 82. In FIG. 9, the first subassembly 81 consists of first battery 301, second battery 302 and third battery 303 layered and connected to each other in series. The second subassembly 82 consists of four batteries 304, 305, 306 and 307 layered and connected to each other in series. The first subassembly 81 has a sleeve 43 with an anode terminal 41*a* attached, while the second subassembly 82 has a sleeve 43 with a cathode terminal 41*c* attached. The first subassembly 81 and the second subassembly 82 are connected electrically by connecting tabs 303*p* and 304*m* to each other. Battery 303 of the first subassembly 81 and a battery 304 of the second subassembly 82 are adhered to each other by double-sided adhesive tape. Other adhesives or attachment methods may be used as well.

Each of spacers 401-411 is of a board shape to hold a tab from both sides of the tab along the battery layering direction, and the spacers are electrically insulative. Spacers 401-411 have an opening window to allow the tabs to be adhered to each other by ultrasonic welding. By holding tabs between spacers 401-411, tab vibration is suppressed when vibration occurs and stress is spread out from the tabs. Therefore, the durability of tabs, and also the durability of assembled batteries, may be improved. In addition, because tabs are held by electrically insulative spacers 401-411, short circuits between tabs may be prevented even though a shorter distance between the batteries or tabs is present. Therefore, by minimizing the distance between the batteries, battery module size may be decreased when compared to battery modules with greater spacing between tabs.

Electrode part 41a of an anode terminal 41 is welded to an anode tab 301m of the first battery 301 by ultrasonic welding. Electrode part 41a of a cathode terminal 41 is welded to a cathode tab 307p of the seventh battery 307 by ultrasonic welding. In the cell unit shown in FIG. 9, the sleeves with terminals 43 are placed diagonally across the batteries.

Referring to FIG. 10, various shapes of tabs are possible. The tab shape is determined by consideration of tab welding at subassemblies 81 and 82, tab welding between subassemblies 81 and 82, and welding between the electrode part 41a of the terminal 41 and the tab.

In FIG. 10, the tabs connected electrically are connected by two-dot broken lines. "Black squares" next to the connection lines represent welding of tabs by ultrasonic welding at openings of spacers 401-411 in the first and the second subassemblies 81 and 82. "White circles" next to the connection lines represent welding of tabs by ultrasonic welding after assembling of the first and the second subassemblies 81 and 82.

Before welding tabs together, the electrode part 41a of the anode terminal 41 is welded to the anode tab 301m of the first battery. The electrode part 41a of the cathode terminal 41 is welded to the cathode tab 307p of the seventh battery. The order of welding of tabs is as follows: In the first subassembly 81, the cathode tab 301p of the first battery 301 is welded to the anode tab 302m of the second battery 302, then the cathode tab 302p of the second battery 302 is welded to the anode tab 303m of the third battery 303. In the second subassembly 82, the cathode tab 304p of the fourth battery 304 is welded to the anode tab 305m of the fifth battery 305. Then the cathode tab 305p of the fifth battery 305 is welded to the anode tab 306m of the sixth battery 306, and the cathode tab 306p of the sixth battery 306 is welded to the anode tab 307m of the seventh battery 307. Further, the cathode tab 303p of the third battery 303 in the first subassembly 81 is welded to the anode tab 304m of the fourth battery 304 in the second subassembly 82. With the process above, the layered seven batteries 301-307 are connected in series by electrically connecting opposite electrode tabs to each other, and the anode terminal 41 and cathode terminal 41 are connected to the first battery 301 and the seventh battery 307, respectively. In this manner, the anode terminal 41 and cathode terminal 41 are positioned at opposite ends of the cell unit.

The assembled battery 10 in embodiment 1 consists of layers of more than one of battery modules 20 of the above-mentioned structure. In the assembled battery 10, two battery modules 20 next to each other are locked by a through-bolt 31 inserted into the battery modules 20. At the same time, batteries 28 of these battery modules 20 are connected electrically through the conductive collar 42. The conductive collar 42 is electrically connected to the through-bolt 31 by contacting the through-bolt 31. Thereby, the batteries 28 of these battery modules 20 are electrically connected to each other through the conductive collar 42 and the through-bolt 31. An assembled battery is described hereinafter.

Referring to FIG. 4, an electrically connected state of the assembled battery 10 is described below. The four rows of battery module groups 20a are respectively referred to, from left to right, as the 1st row, 2nd row, 3rd row, and 4th row of battery module groups 20a. Within each battery module group 20a, from bottom to top, reference is made to battery modules 20 of the lowest level (L), middle level (M), and uppermost level (U). Thus, for example, to represent the uppermost level (U) in the 1st row of the battery module groups 20a, an abbreviation such as 'battery module (1-U)' is used for the description.

A cathode external terminal board 51 is located outside the battery module (1-U), whereas an anode external terminal board 52 is located outside the battery module (4-U). External terminal boards 53, 54 and 55 are also located between the battery modules 20 in the uppermost level that are adjacent to each other. In other words, external terminal boards 53, 54 and 55 are respectively located between the battery module (1-U) and the battery module (2-U), between the battery module (2-U) and the battery module (3-U), and between the battery module (3-U) and the battery module (4-U). Electrically conductive through-bolts 31 are inserted into the external terminal boards 51-55 to be electrically connected to the external terminal boards 51-55. Electrically insulative protection caps 56 are attached to the through-bolts 31 and the external terminal boards 51-55 (see FIG. 1).

There are two types of electrical connections established by the conductive collar 42, terminals 41 and through-bolts 31. These connections include electrical connections between battery modules 20, and electrical connections between battery modules 20 and external terminal boards 51-55. Arrows s1-s13 in FIG. 4 conceptually represent an electrically connected status established in the assembled battery 10, each illustrating an electrically connected state, respectively.

Arrow s1 connects between the cathode side external terminal board 51 and the cathode electrode tab 28p in the battery module (1-L). Arrow s2 connects between the anode electrode tab 28m in the battery module (1-L) and the cathode electrode tab 28p in the battery module (1-M). Arrow s3 connects between the anode electrode tab 28m in the battery module (1-M) and the cathode electrode tab 28p in the battery module (1-U). Arrow s4 connects between the anode electrode tab 28m in the battery module (1-U) and the external terminal board 53 and the cathode electrode tab 28p in the adjacent battery module (2-U). Arrow s5 connects between the anode electrode tab 28m in the battery module (2-U) and the cathode electrode tab 28p in the battery module (2-M). Arrow s6 connects between the anode electrode tab 28m in the battery module (2-M) and the cathode electrode tab 28p in the battery module (2-L). Arrow s7 connects between the anode electrode tab 28m in the battery module (2-L) and the external terminal board 54 and the cathode electrode tab 28p in the adjacent battery module (3-L). Arrow s8 connects between the anode electrode tab 28m in the battery module (3-L) and the cathode electrode tab 28p in the battery module (3-M). Arrow s9 connects between the anode electrode tab 28m in the battery module (3-M) and the cathode electrode tab 28p in the battery module (3-U). Arrow s10 connects between the anode electrode tab 28m in the battery module (3-U) and the external terminal board 55 and the cathode electrode tab 28p in the adjacent battery module (4-U). Arrow s11 connects between the anode electrode tab 28m in the battery module (4-U) and the cathode electrode tab 28p in the battery module (4-M). Arrow s12 connects between the anode electrode tab 28m in the battery module (4-M) and the cathode electrode tab 28p in the battery module (4-L). Arrow s13 connects between the anode electrode tab 28m in the battery module (4-L) and the anode side external terminal board 52.

Figure 14A:
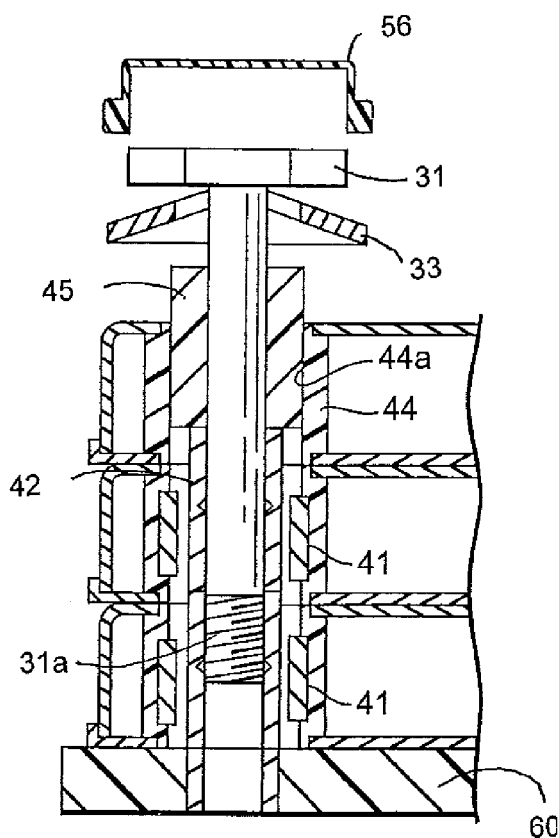
Figure 14B:
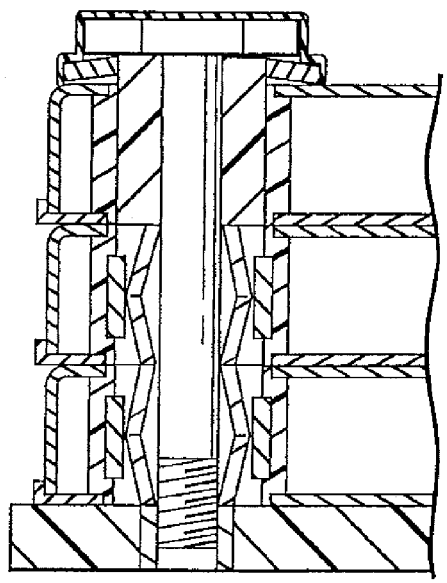
Figure 15:
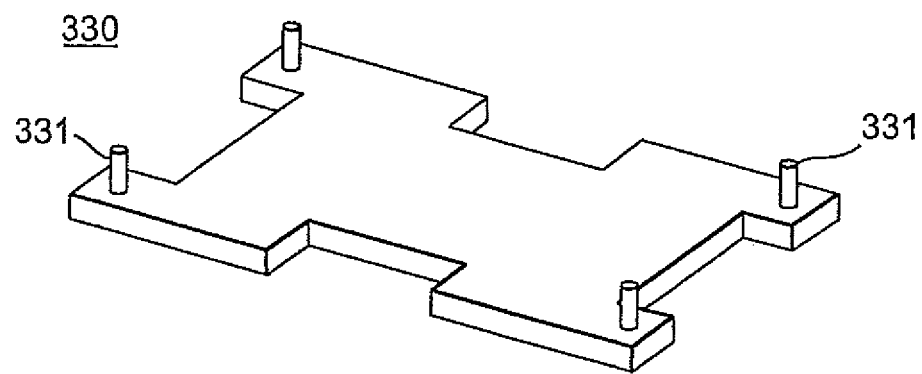
FIG. 15 is a perspective view illustrating an assembling jig to produce a battery module.

FIGS. 14A and 14B illustrate the way in which electrical connections represented by the arrow s2 or by the arrow s8 in FIG. 4 are established. FIG. 14A illustrates a state before more than one of battery modules 20 are locked to each other, and FIG. 14B illustrates a state in which electrical connections are established at the same time as more than one of battery modules 20 are locked to each other with a shaft member. Additional elements may be required when stacking 4 or more battery modules together in embodiment 1.

Battery module groups 20a are mounted on bottom housing 60 which is the housing for an assembled battery. The bottom housing 60 is made from an electrically insulated resin material. On the bottom housing 60, corresponding to the locations of the bolt holes 27, nuts 32 are inserted into the screw part 31a of the tip of a through-bolt 31 and are screwed. Between the head of the through-bolt 31 and the battery module 20 of the uppermost level, a spring washer 33 is provided which biases the resilient force to hold down the battery module group 20a. Insulation washer 57 is placed between the external terminal boards and the through-bolts 31 (see FIGS. 2 and 3).

In the case of securing more than one of battery modules 20, first, as shown in FIG. 14A, mount a battery module group 20a consisting of layers of three battery modules 20 on the bottom housing 60. Next, insert a through-bolt 31 that has already passed through a spring washer 33 into each battery module 20, and then screw the screw part 31a into the nut 32. In this manner, as shown in FIG. 14B, three battery modules 20 are tightened to ensure that the stacked layers have the axial force of the through-bolt 31 applied. Furthermore, the resilient force of the compressed spring washer 33 has been biased, ensuring the stacked and layered state of the three battery modules 20 can be maintained for a long period of time.

In this embodiment, means to establish electrical connections consist of a terminal 41 located in the module housing 23 that is electrically connected to a battery 28, and a conductive collar 42 deformed in the direction perpendicular (horizontal directions in FIG. 14) to the axial direction (vertical directions in FIG. 14) of a through-bolt 31 by the axial force of the through-bolt 31 to get direct contact with the terminal 41. Both the through-bolt 31 and the conductive collar 42 are electrically conductive. Hence, electrical connections are established through the conductive collar 42 that is deformed by the axial force of the through-bolt 31 and is pressed against the terminal 41 and through the through-bolt 31 that is in contact with the conductive collar 42. Since the through-bolt 31 has dual functions including a function to lock more than one of battery modules 20 and a function as a bus bar to provide an electric connection, it is possible to simultaneously reduce the number of parts and the resources required for assembly.

Four through-bolts 31 are inserted into one battery module 20. For the through-bolt 31 illustrated in FIGS. 14A and 14B, among the three battery modules 20, the lowest level and the middle level of the battery modules include parts to establish electrical connections. However, the battery module 20 of the uppermost level does not include a part to establish electrical connections. For the battery module 20 of the lowest levels, the terminal 41 and the anode electrode tab 28m are electrically connected, and for the battery module 20 of the middle level, the terminal 41 and the cathode electrode tab 28p are electrically connected.

In addition, conductive collars 42 are located in the module housings 23 of the battery modules 20 of the lowest and the middle levels in which parts to establish electrical connections are included. Within the housing of the battery module 20 of the uppermost level, in which a part to establish electrical connections is not included, an electrically insulated insulation collar 45 is present to transmit the axial force of a through-bolt 31 to the conductive collars 42.

Furthermore, the insulation collar 45 is inserted into a center hole 44a of a sleeve 44 and comes in direct contact with the inner circumferential surface of the sleeve 44. When the through-bolt 31 is tightened, the axial force of the through-bolt 31 is transmitted to the conductive collars 42 through the insulation collar 45, and subsequently, the conductive collars 42 become deformed to be opened and come in direct contact with the terminal 41.

Furthermore, within a limit of not interfering with the function to transmit the axial force of the through-bolt 31 to the conductive collars 42, the insulation collar 45 may be deformed by the axial force of the through-bolt 31 and may come in direct contact with the inner circumference surface of the sleeve 44. A sleeve 44 in a part where electrical connections are not required to be established allows the sleeve 44 to function as an assembly part to attach the insulation collar 45.

By changing the alignment of the conductive collar 42 and the insulation collar 45, it is possible to establish electrical connections in a desired manner. For instance, the arrow s2 in FIG. 4, as illustrated in FIGS. 2, 14A and 14B, shows that by locating a conductive collar 42, a conductive collar 42 and an insulation collar 45, in order from the bottom, electrical connections between the battery modules 20 of the lowest level and the middle level can be established. In the same manner, electrical connections represented by the arrow s6, s8 or s12 in FIG. 4 are established. To establish electrical connections indicated by the arrow s1, s7 or s13 in FIG. 4, a conductive collar 42, an insulation collar 45 and an insulation collar 45, in order from the bottom, are used to create electrical connections between the lowest battery modules 20 and the external terminal boards 51, 54 and 52 (see FIG. 2). To establish electrical connections indicated by the arrow s4 in FIG. 4, an insulation collar 45, an insulation collar 45 and a conductive collar 42, in order from the bottom, are used to create electrical connections between the battery module (1-U) and external terminal board 53. Electrical connection with the adjacent battery module (2-U) can be established through the external terminal board 53 (see FIG. 3). Electrical connections represented by the arrow s10 in FIG. 4 may be completed in a similar manner.

Since electrical connections between battery modules 20 that are adjacent to each other in the stacked and layered direction are established through conductive collars 42 and through-bolts 31, the contact point will not be exposed to the outside of the module housings 23. Therefore, compared to a case in which a bus bar is used for a connection, a means for preventing a short circuit is required at fewer points to reduce the resources needed for assembly.

Figure 11A:
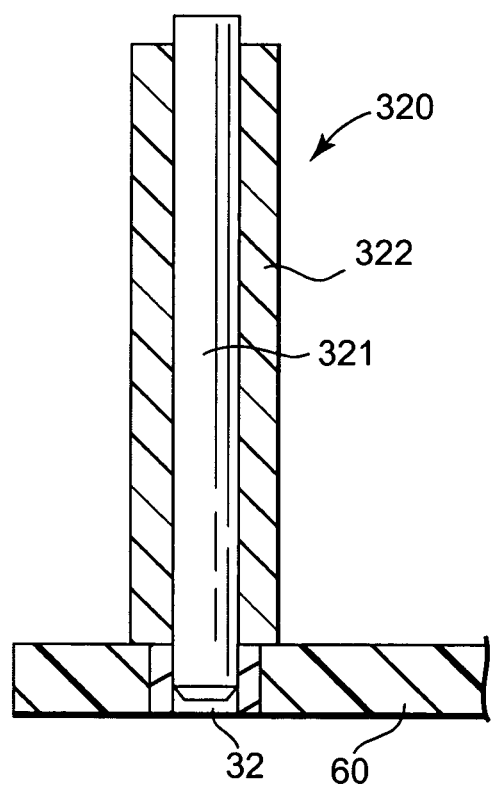
FIGS. 11-14 are schematic process charts illustrating the production of an assembled battery.

Referring to FIGS. 11A-14B, the production process of the assembled battery 10 is explained. A battery module group 20a in one row is described. As shown in FIG. 11A, to produce an assembled battery 10, four jigs 320 are inserted in four nuts 32 of bottom housing 60 of the assembled battery housing. Each jig 320 has a locate pin 321 to be inserted into the nut 32 and pipe part 322 to be inserted into the locate pin 321. The outer diameter of the pipe part 322 is smaller than the inner diameter of bolt hole 27 of the module housing 23, and the outer diameter of the locate pin is smaller than the outer diameter of through-bolt 31.

Figure 11B:
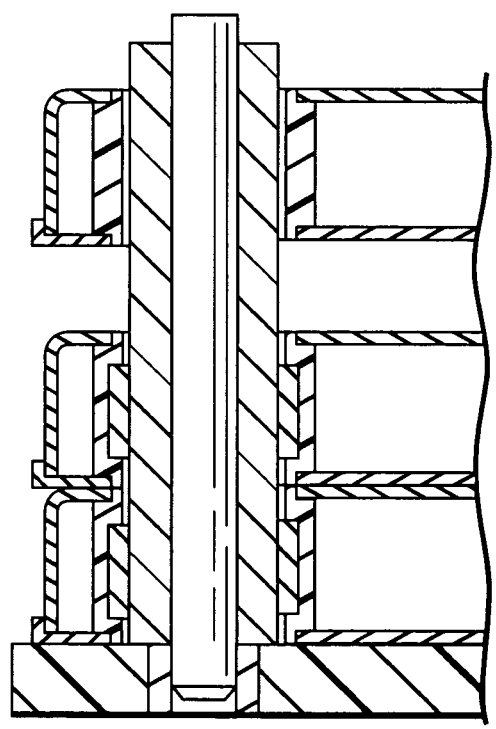

As shown in FIG. 11B, four bolt holes 27 of the module housing 23 are inserted into the four pipe parts 322. Using the pipe parts 322 as a guide, three battery modules 20 are inserted.

Figure 12:
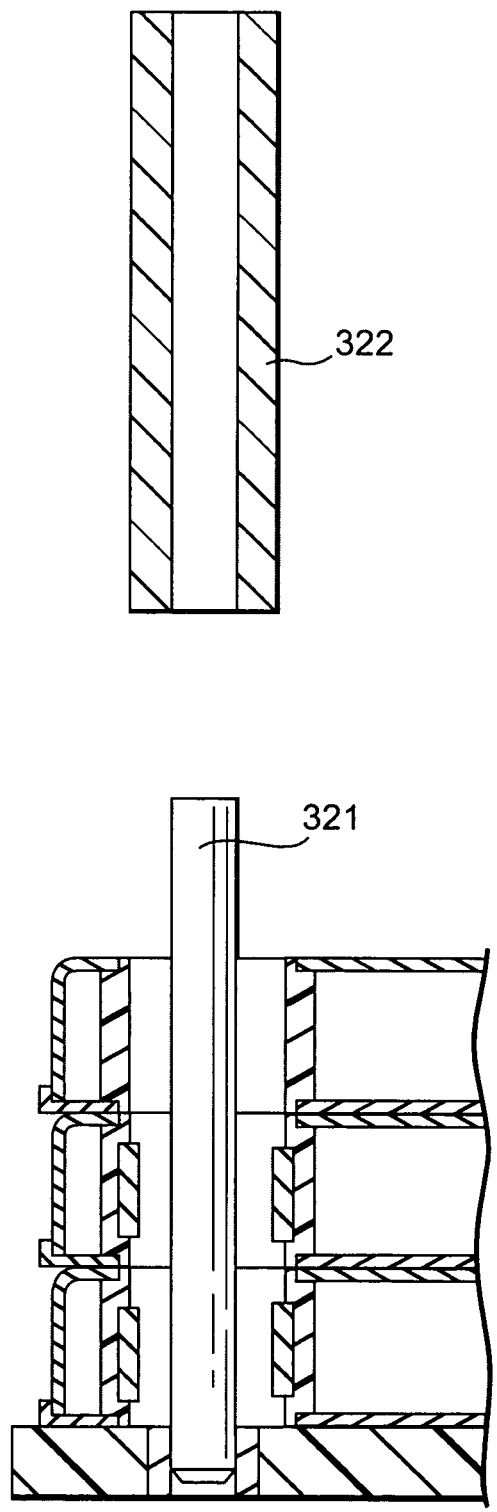

As shown in FIG. 12, a pipe part 322 of one jig is pulled out from the locate pin 321. Even after pulling out one pipe part 322, position of the three battery modules 20 is not changed due to the other three jigs 320.

Figure 13:
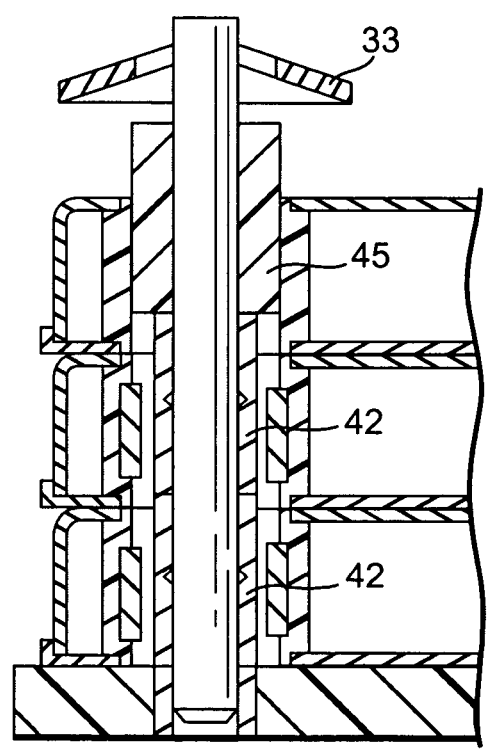

As shown in FIG. 13, a conductive collar 42 and an insulation collar 45 are inserted into the locate pin 321 according to an order depending on the electrical connection to be established. FIG. 13 illustrates the case in which electrical connections represented by the arrow s2 or s8 in FIG. 4 are established. This connection includes a conductive collar 42, a conductive collar 42 and an insulation collar 45 inserted in order. A spring washer 33 is inserted as well.

As shown in FIG. 14A, locate pin 321 is pulled out and through-bolt 31 is inserted into the insulation collar 45, the conductive collar 42 and the conductive collar 42. As shown in FIG. 14B, when the through-bolt 31 is tightened, the axial force of the through-bolt 31 is transmitted to the conductive collars 42 through the insulation collar 45. Subsequently, the conductive collars 42 become deformed to be opened and come in direct contact with the terminal 41.

After the same procedure is done at the other three positions, the tightening torque of the four through-bolts 31 is adjusted, and protection caps 56 are attached to each through-bolt 31. After this process, assembly of a battery module group 20a of one row is completed. When the above procedure is done on all of the other battery module groups 20a, the production process of the assembled battery 10 is completed.

Referring to FIGS. 15-17B, production process of the battery module 20 is described. As the production process of battery module 20, an assembling jig 330 attached with four locate pins 331 is used as shown in FIG. 15. The four locate pins 331 are installed at the same position as bolt holes 27 of the module housing 23. The outer diameter of the locate pin 331 is smaller than the inner diameter of the bolt hole 27.

Figure 16A:
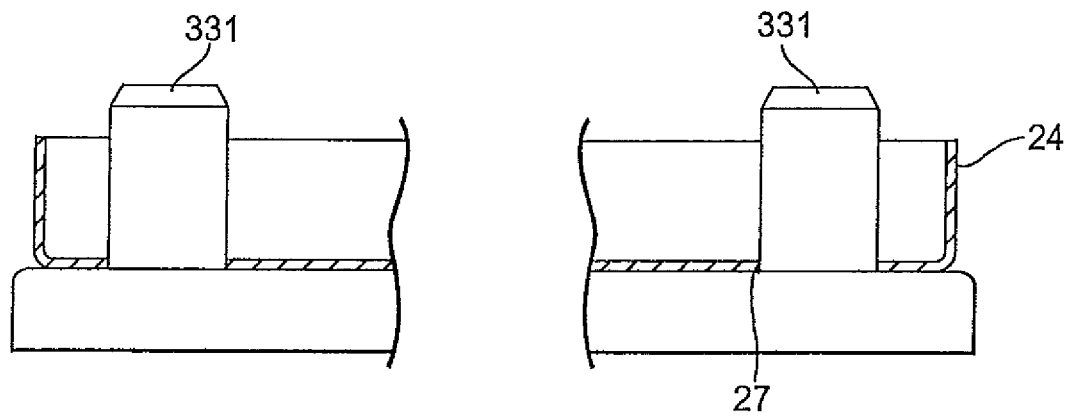
FIGS. 16-17 are schematic process charts illustrating the production of a battery module.
Figure 16B:
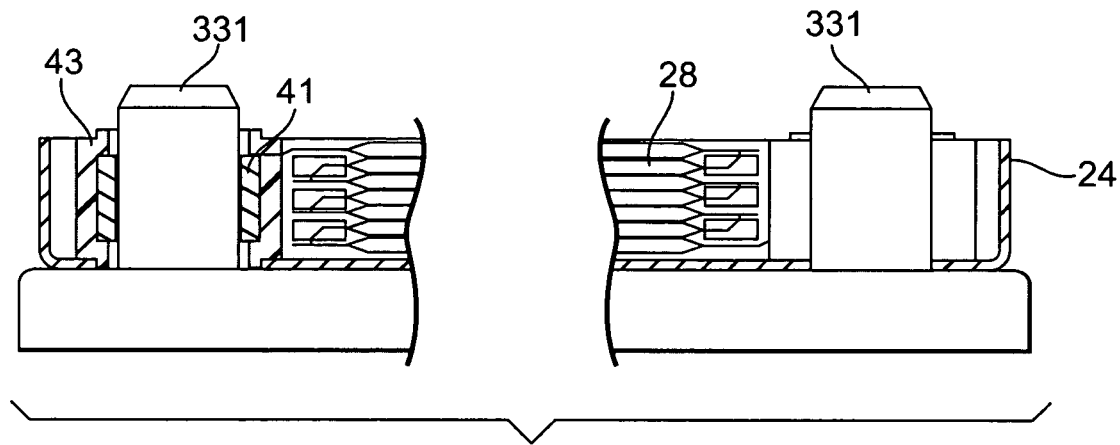
Figure 16C:
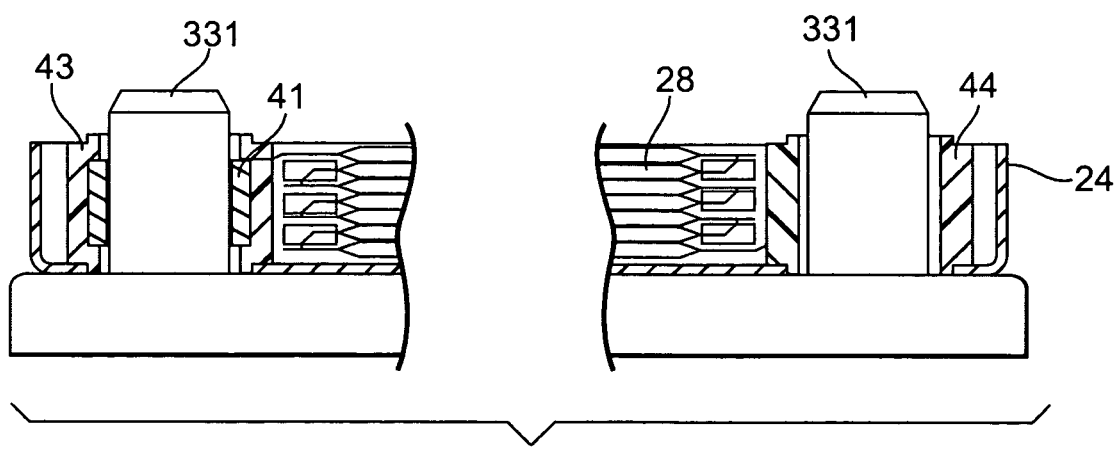

As shown in FIG. 16A, four bolt holes 27 of the first housing 24 are inserted into the four locate pins 331. As shown in FIG. 16B, a cell unit with adhesive applied on the top and bottom surfaces is set in the first housing 24. At the same time, two sleeves 43 with terminals 41 attached and integrated into the cell unit are inserted into two locate pins 331. In FIG. 16B, two sleeves 43 equipped with terminal 41 are placed diagonally across. One of the two sleeves 43 equipped with terminal 41 is inserted into the locate pin 331 on the left in the FIG. 16B, and the other is inserted into the hidden locate pin 331 behind the right locate pin in the FIG. 16B. In this way, the position of the cell unit is limited in accordance with the first housing 24. As shown in FIG. 16C, two sleeves 44 without terminals 41 are inserted into the other two locate pins 331.

Figure 17A:
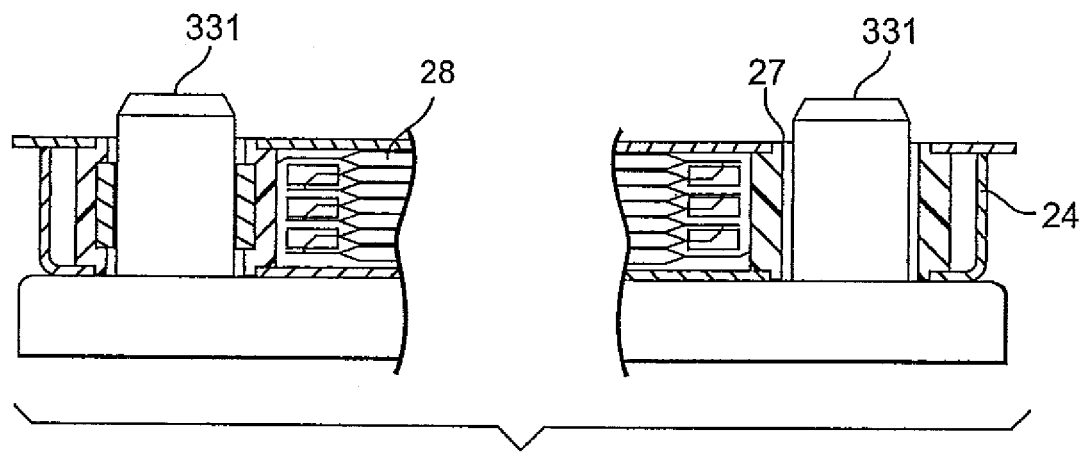
Figure 17B:
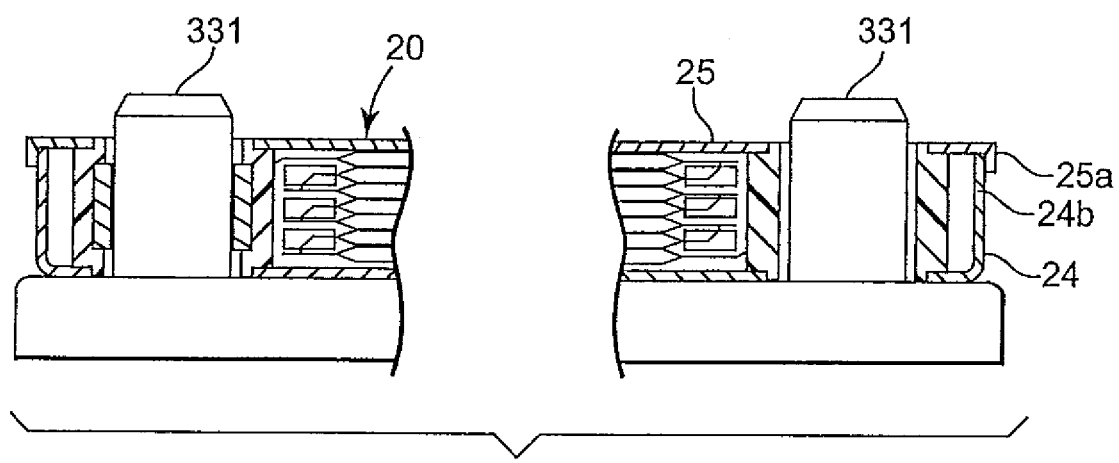

As shown in FIG. 17A, four bolt holes 27 of the second housing 25 are inserted into the four locate pins 331. As shown in FIG. 17B, the whole set along with assembly jig 330 is thrown into a tightener. By a caulking process, the edge 25a of the second housing 25 is tightened and wound around the edge 24b of the first housing 24. After this tightening procedure and pulling out the battery module 20 from the assembly jig 330, the production of the battery module 20 is completed.

As above-mentioned, a battery module 20 in embodiment 1 has a battery 28, a module case 23 accommodating the battery 28 where a through-bolt 31 is inserted, a conductive collar 42 placed around the through-bolt 31 coaxially as well as electrically connected to external terminals 51-55 or other battery modules 20, and a terminal 41 placed around the conductive collar 42 that electrically connects the battery 28 to the conductive collar 42. Therefore, procedures to establish electrical connections in producing assembled batteries 10 can be simplified compared to the case in which each bus bar has to be tightened by bolts.

The conductive collar 42 is electrically connected to the through-bolt 31 by contacting with the through-bolt 31. Thereby, the battery 28 can be electrically connected to the external terminals 51-55 or other battery modules 20 by contact with a conductive collar 42 and the through-bolt 31.

The assembled battery 10 of embodiment 1 consists of layers of more than one battery module 20 of the above-mentioned structure. Two battery modules 20 next to each other are locked by a through-bolt 31 inserted into the battery modules 20, at the same time as the batteries 28 of these battery modules 20 are connected electrically through a conductive collar 42. Establishing electrical connections may be simplified through using through-bolt 31 to secure and electrically connect battery modules 20 in comparison to the case in which each bus bar has to be tightened by a bolt.

The conductive collar 42 is electrically connected to the through-bolt 31 by contact with the through-bolt 31. Thereby, the batteries 28 of these battery modules 20 can be electrically connected each other through the conductive collar 42 and the through-bolt 31.

Since electrical connections are established through conductive collars 42 deformed and pressed against output terminals 41 by the axial force of through-bolts 31, and through the through-bolts 31 that are in contact with the conductive collars 42, favorable electrical connections can be established by ensuring contact between the terminals 41 and the conductive collars 42.

A conductive collar 42 is cylindrically shaped to allow the insertion of a through-bolt 31. Conductive collar 42 is buckled by the axial force of the through-bolt 31, and is deformed in the direction perpendicular to the axial direction of the through-bolt 31. The deformation ensures contact between the terminal 41 and the conductive collar 42. Furthermore, when the conductive collar 42 is deformed, oxidized coats on the surface of the output terminal 41 are removed to reduce electrical impedance of the electrical connections.

Simply by selecting alignment positions of the conductive collars 42, electrical connections between the battery modules 20 or electrical connections between the battery modules 20 and external terminal boards 51-55 can be established.

Further, insulation collars 45 to transmit the axial force of the through-bolts 31 to conductive collars 42 are provided. Changing the alignment between the conductive collar 42 and the insulation collar 45 cause electrical connections in desired routes to be easily established.

Figure 18:
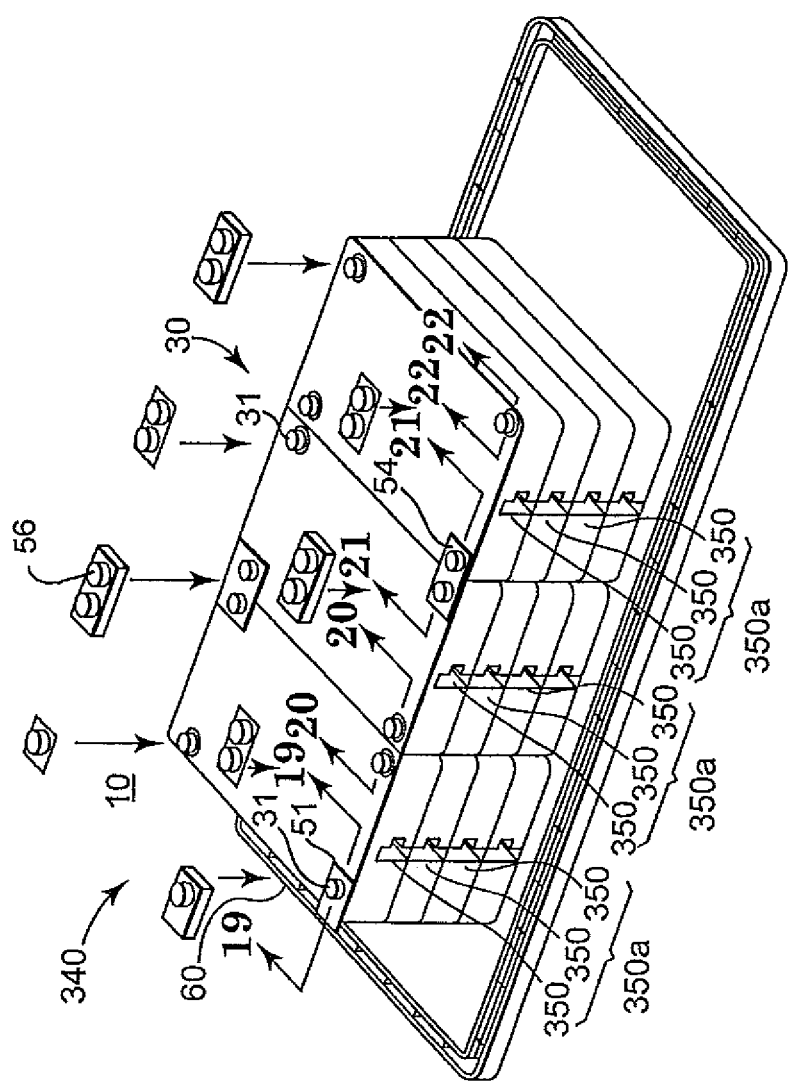
FIG. 18 is a perspective view illustrating an assembled battery of embodiment 2.
Figure 19:
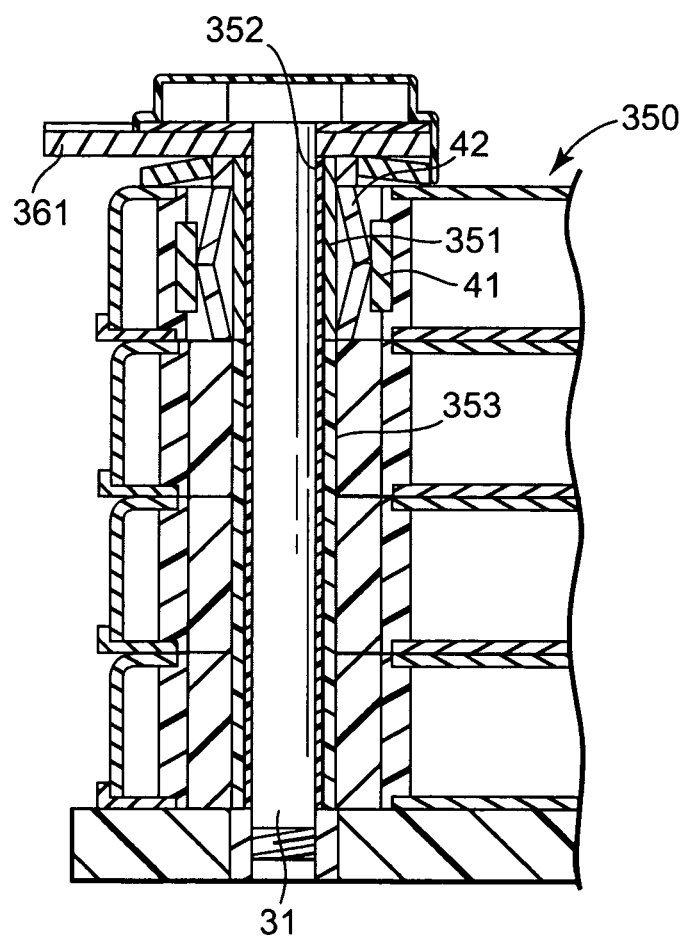
FIG. 19 is a cross section view along the 19-19 line in FIG. 18.
Figure 20:
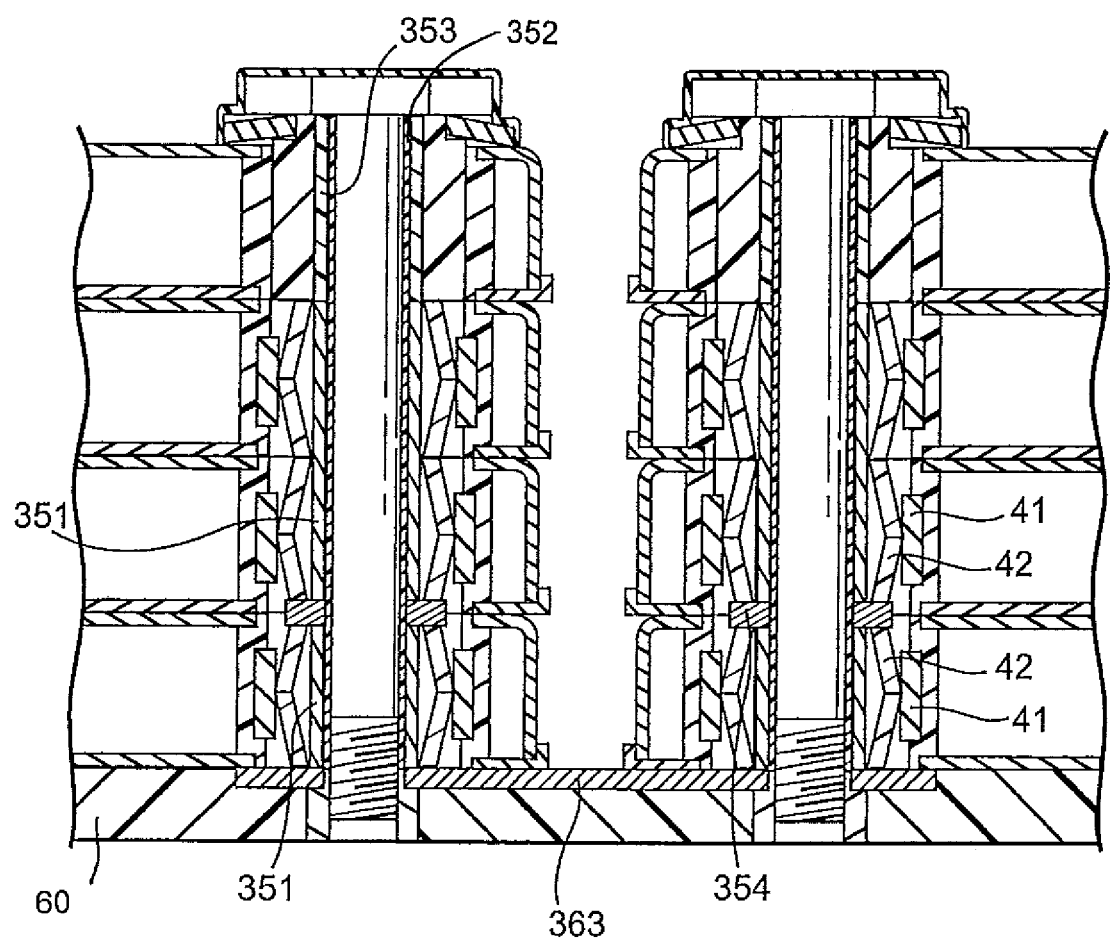
FIG. 20 is a cross section view along the 20-20 line in FIG. 18.
Figure 21:
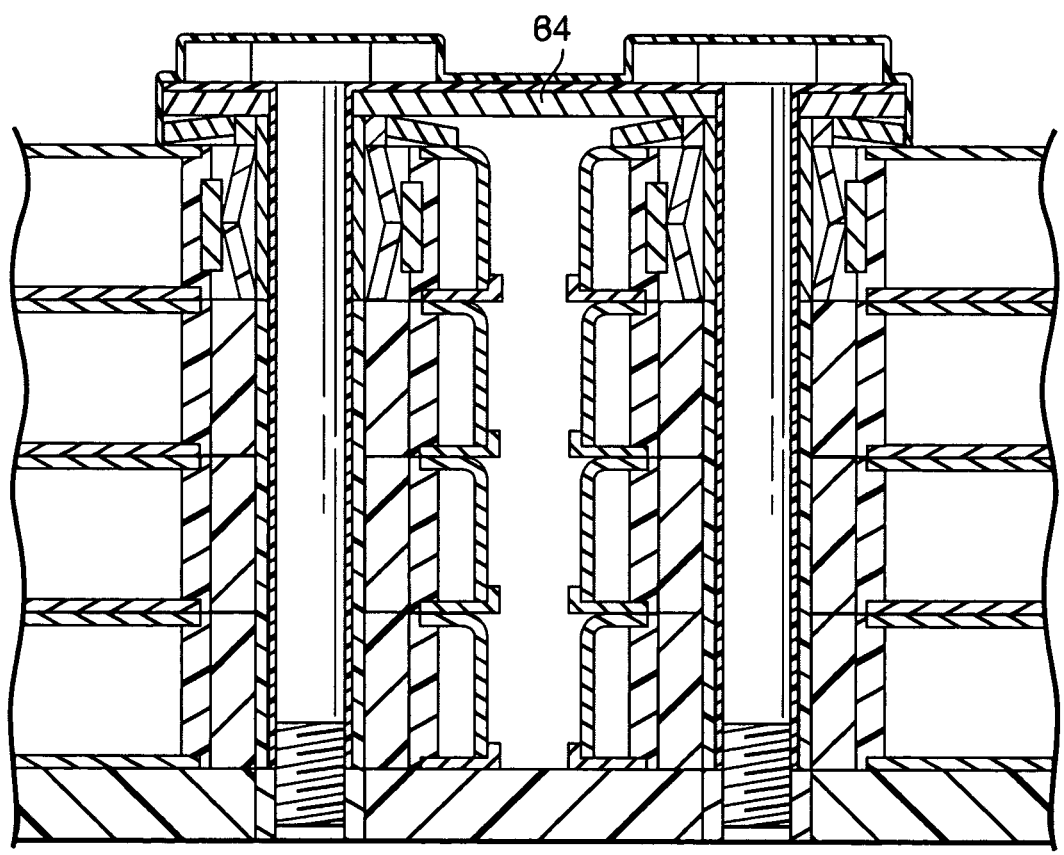
FIG. 21 is a cross section view along the 21-21 line in FIG. 18.
Figure 22:
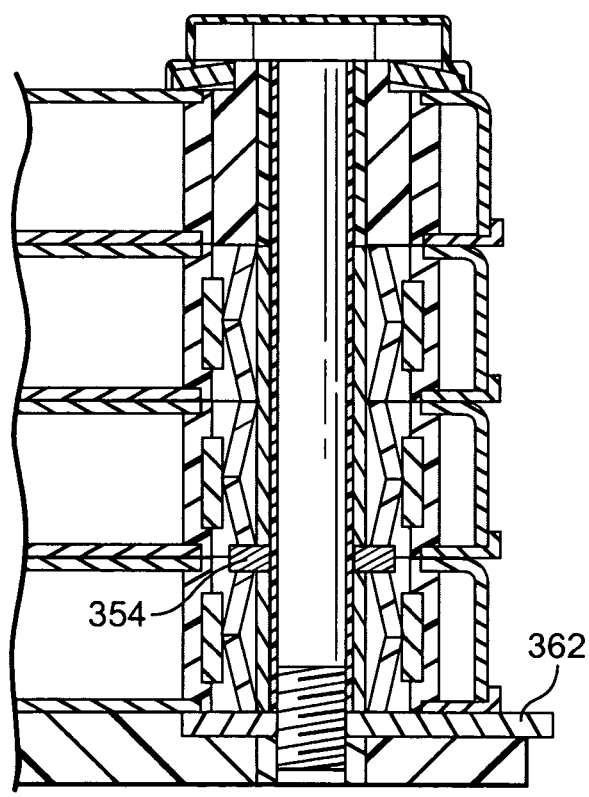
FIG. 22 is a cross section view along the 22-22 line in FIG. 18.
Figure 23:
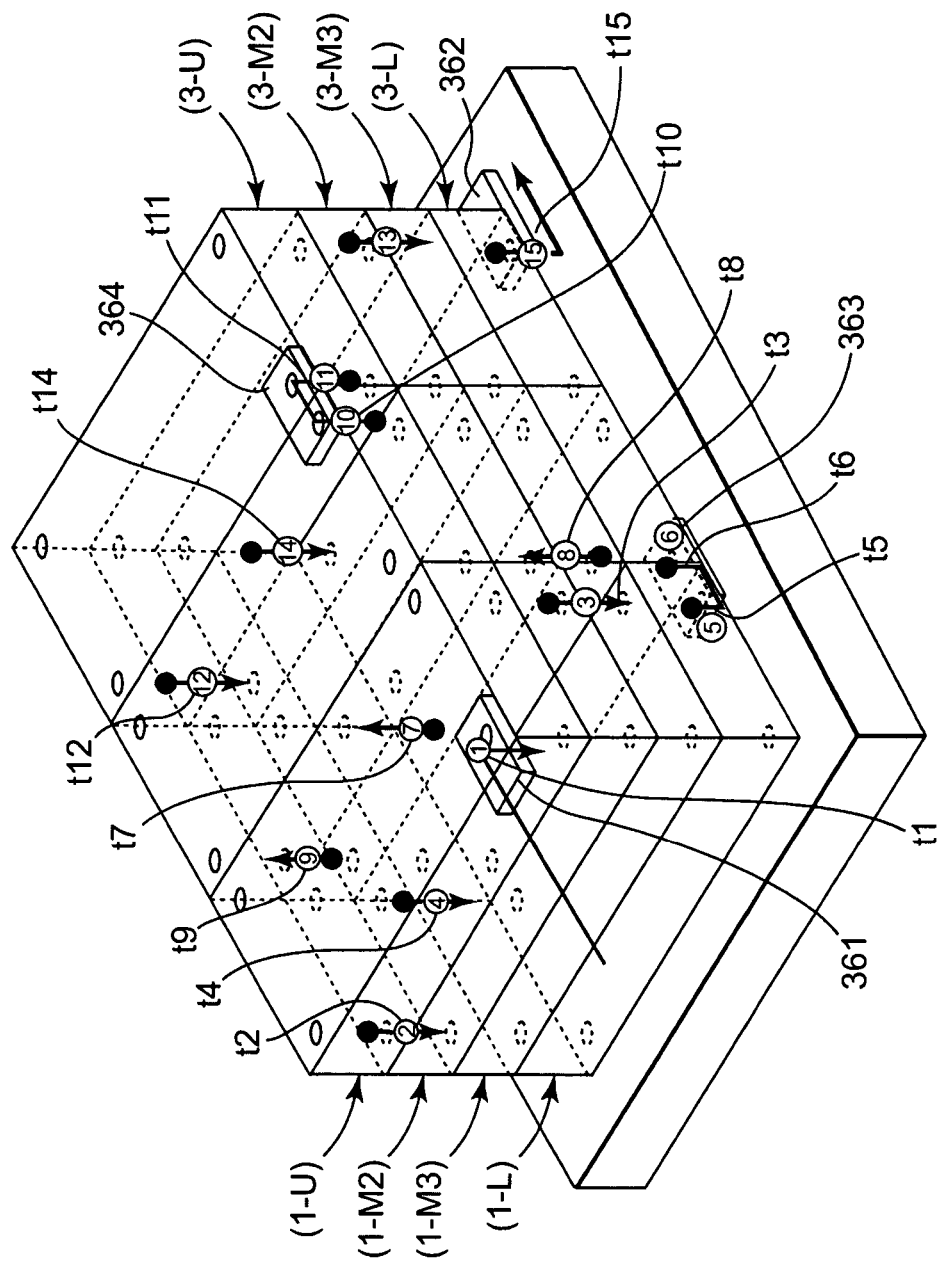
FIG. 23 is a perspective view conceptually illustrating an electrically connected state of an assembled battery.

FIG. 18 is a perspective view illustrating an assembled battery 340 related to embodiment 2 of the present invention, and FIG. 19 is a cross section view along the 19-19 line in FIG. 18. FIG. 20 is a cross-section view along the 20-20 line in FIG. 18, FIG. 21 is a cross section view along the 21-21 line in FIG. 18, and FIG. 22 is a cross section view along the 22-22 line in FIG. 18. FIG. 23 is a perspective view conceptually illustrating an electrically connected state of an assembled battery 340. Common numerals are attached to the common members as those in embodiment 1 described above, and those respective descriptions are partially omitted hereafter.

Embodiment 2 is different from embodiment 1 in that battery modules 350 are layered with more than 3 tiers, i.e., 4 tiers in embodiment 2, and the method to establish electrical connections is also different. Referring to FIGS. 19-22, a battery module 350 in embodiment 2 has, in the same way as in the battery module 20 in Embodiment 1, a battery 28, a module case 23 accommodating the battery 28 where a through-bolt 31 is inserted, a conductive collar 42 placed around the through-bolt 31 coaxially as well as electrically connected to external terminals 51-55 or other battery modules 20, and a terminal 41 placed around the conductive collar 42 that electrically connects the flat type battery 28 to the conductive collar 42.

When the battery modules 350 are layered for more than four tiers, one through-bolt 31 may support different electrical polarities. Therefore, it is required to insulate the through-bolt 31. Also, conductive collars 42 next to each other have to be insulated as well.

Because of the reasons above, the battery module 350 is equipped with a sleeve 351 placed around the through-bolt 31 coaxially and insulation 352 placed between the sleeve 351 and the through-bolt 31. The conductive collar 42 is electrically connected to the sleeve 351 by contacting with the sleeve 351, and the battery 28 is electrically connected to the external terminals 361-364 or other battery modules 350 through the conductive collar 42 and the sleeve 351.

The sleeve 351 is cylindrically shaped to allow insertion of a through-bolt 31. The sleeve 351 is placed around the through-bolt 31 coaxially by insertion of the through-bolt 31. The sleeve 351 is made from electrically conductive material such as metallic materials. The sleeve 351 may be long enough to establish an electrical connection; there may be various lengths of sleeves 351 available to make this connection. Insulation sleeve 353 is also placed to keep the sleeve 351 in the position to establish electrical connection. The insulation sleeve 353 is cylindrically shaped so as to allow insertion of a through-bolt 31, and is made from electrically insulated materials such as resin materials. There are also various lengths of sleeves 353 available.

The insulation 352 is cylindrically shaped to allow insertion of a through-bolt 31. The insulation 352 is placed to cover all length of the through-bolt 31. The insulation 352 is made from electrically insulated materials such as resin materials.

Also, as shown in FIGS. 20 and 22, an insulation ring 354 is also equipped to insulate conductive collars 42 next to each other. The insulation ring 354 is made from electrically insulated materials such as resin materials.

Referring to FIG. 23, an electrically connected state of the assembled battery 340 includes the three rows of battery module groups 350a, respectively referred to from left to right as the 1st row, 2nd row and 3rd row of battery module groups 350a. Within each battery module group 350a, from bottom to top, reference is made to battery modules 350 of the lowest level (L), lower middle level (M3), upper middle level (M2) and uppermost level (U). Thus, for example, to represent a battery module 350 of the uppermost level (U) in the 1st row of the battery module groups 350a, an abbreviation such as 'battery module (1-U)' is used for the description.

A cathode external terminal board 361 is located outside the battery module (1-U) (see FIG. 19), whereas an anode external terminal board 362 is located outside the battery module (3-L) (see FIG. 22). External terminal boards 363 and 364 are also located between the battery modules 20 in the outermost level that are adjacent to each other. In other words, external terminal boards 363 and 364 are located between the battery module (2-U) and the battery module (3-U), and between the battery module (1-L) and the battery module (2-L) (see FIGS. 20 and 21). The external terminal board 363 shown in FIG. 20 is installed on the top surface of bottom housing 60 of the assembled battery housing. Electrically insulative protection caps 56 are attached to the through-bolts 31 and the external terminal boards 361 and 364.

There are two types of electrical connections established by the conductive collar 42, terminals 41 and through-bolts 31. These are electrical connections between battery modules 350 and electrical connections between battery modules 350 and external terminal boards 361-364. Arrows t1-t15 in FIG. 23 conceptually represent an electrically connected circuit established in the assembled battery 340, each illustrating an electrically connected state.

Arrow t1 connects between the cathode side external terminal board 361 and the cathode electrode tab 28p in the battery module (1-U). Arrow t2 connects between the anode electrode tab 28m in the battery module (1-U) and the cathode electrode tab 28p in the battery module (1-M2). Arrow t3 connects between the anode electrode tab 28m in the battery module (1-M2) and the cathode electrode tab 28p in the battery module (1-M3). Arrow t4 connects between the anode electrode tab 28m in the battery module (1-M3) and the cathode electrode tab 28p in the adjacent battery module (1-L). Arrows t5 and t6 connect between the anode electrode tab 28m in the battery module (1-L) and the external terminal board 363 and the cathode electrode tab 28p in the battery module (2-L). Arrow t7 connects between the anode electrode tab 28m in the battery module (2-L) and the cathode electrode tab 28p in the adjacent battery module (2-M3). Arrow t8 connects between the anode electrode tab 28m in the battery module (2-M3) and the cathode electrode tab 28p in the battery module (2-M2). Arrow t9 connects between the anode electrode tab 28m in the battery module (2-M2) and the cathode electrode tab 28p in the battery module (2-U). Arrows t10 and t11 connect between the anode electrode tab 28m in the battery module (2-U) and the external terminal board 364 and the cathode electrode tab 28p in the battery module (3-U). Arrow t12 connects between the anode electrode tab 28m in the battery module (3-U) and the cathode electrode tab 28p in the battery module (3-M2). Arrow t13 connects between the anode electrode tab 28m in the battery module (3-M2) and the cathode electrode tab 28p in the battery module (3-M3). Arrow t14 connects between the anode electrode tab 28m in the battery module (3-M3) and the cathode electrode tab 28p in the battery module (3-L), and arrow t15 connects between the anode electrode tab 28m in the battery module (3-L) and the anode side external terminal board 362.

For example, FIG. 19 illustrates the manner in which electrical connection represented by the arrow t1 in FIG. 23 is established. The top surface of the sleeve 351 is in contact with the bottom surface of the external terminal board 361. The sleeve 351 is located only on the top tier of the battery module 350. On the battery modules 350 of the bottom three tiers, the insulation sleeve 353 is located so as to support the sleeve 351. When through-bolt 31 is locked, electrical connections are established through the conductive collar 42 that is deformed by the axial force of the through-bolt 31 and pressed against the terminal 41, and connection also goes through the sleeve 351 that is in contact with the conductive collar 42.

In the battery module 350 in embodiment 2, in the same way as in embodiment 1, procedures to establish electrical connections in producing assembled batteries 340 can be simplified when compared to the case in which each bus bar has to be tightened by bolts.

The battery module 350 is equipped with a sleeve 351 placed around the through-bolt 31 coaxially and insulation 352 placed between the sleeve 351 and the through-bolt 31. The conductive collar 42 can be electrically connected to the sleeve 351 by contact with the sleeve 351. Battery 28 is electrically connected to the external terminals 361-364 or other battery modules 350 through the conductive collar 42 and the sleeve 351. With this configuration, desired electrical connections can be established even when battery modules 350 are layered in more than four tiers, which may be beneficial in other embodiments.

Figure 24:
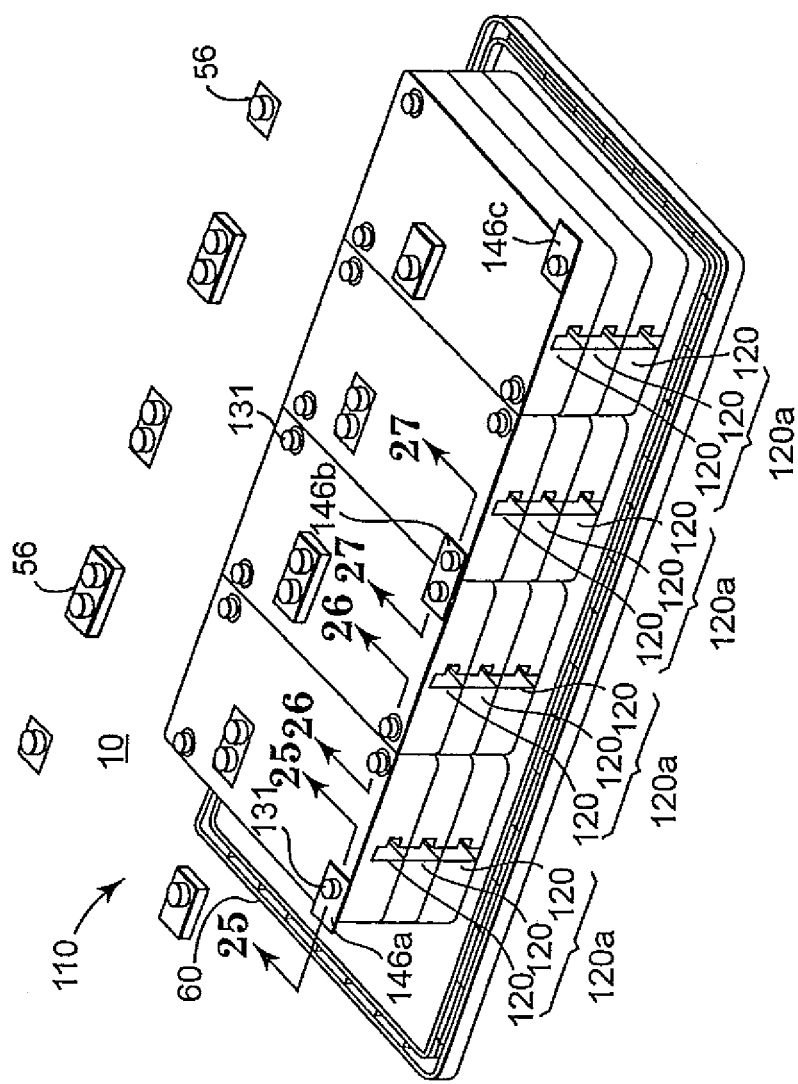
FIG. 24 is a perspective view illustrating an assembled battery of embodiment 3.
Figure 25:
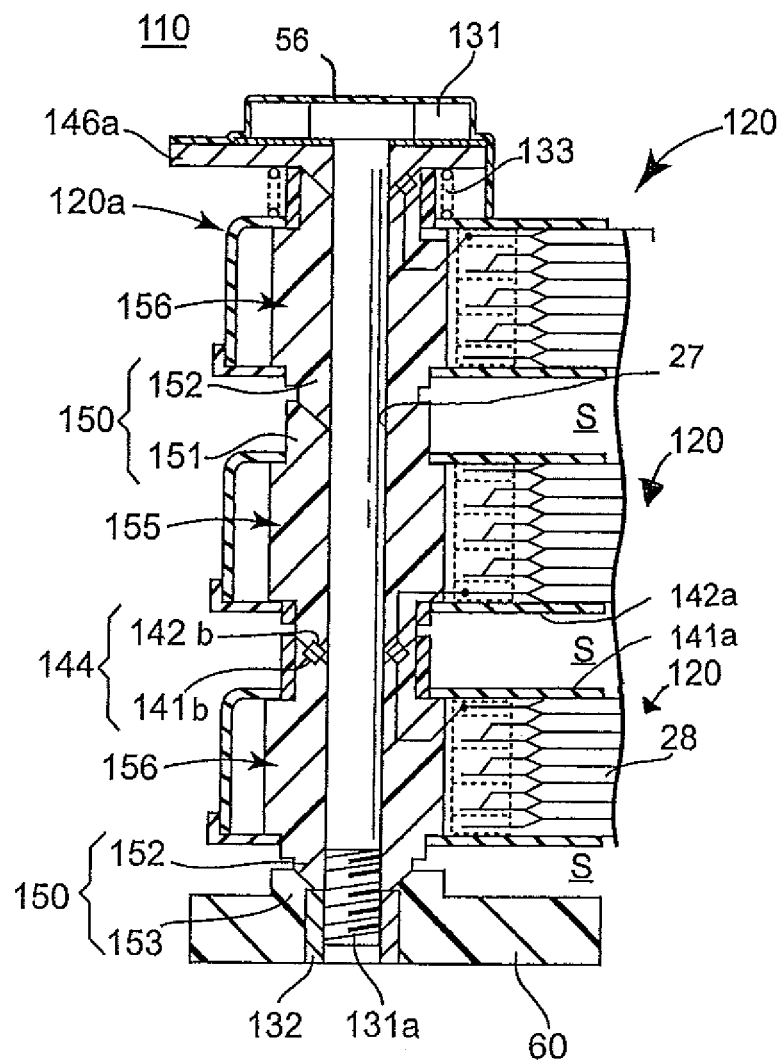
FIG. 25 is a cross section view along the 25-25 line in FIG. 24.
Figure 26:
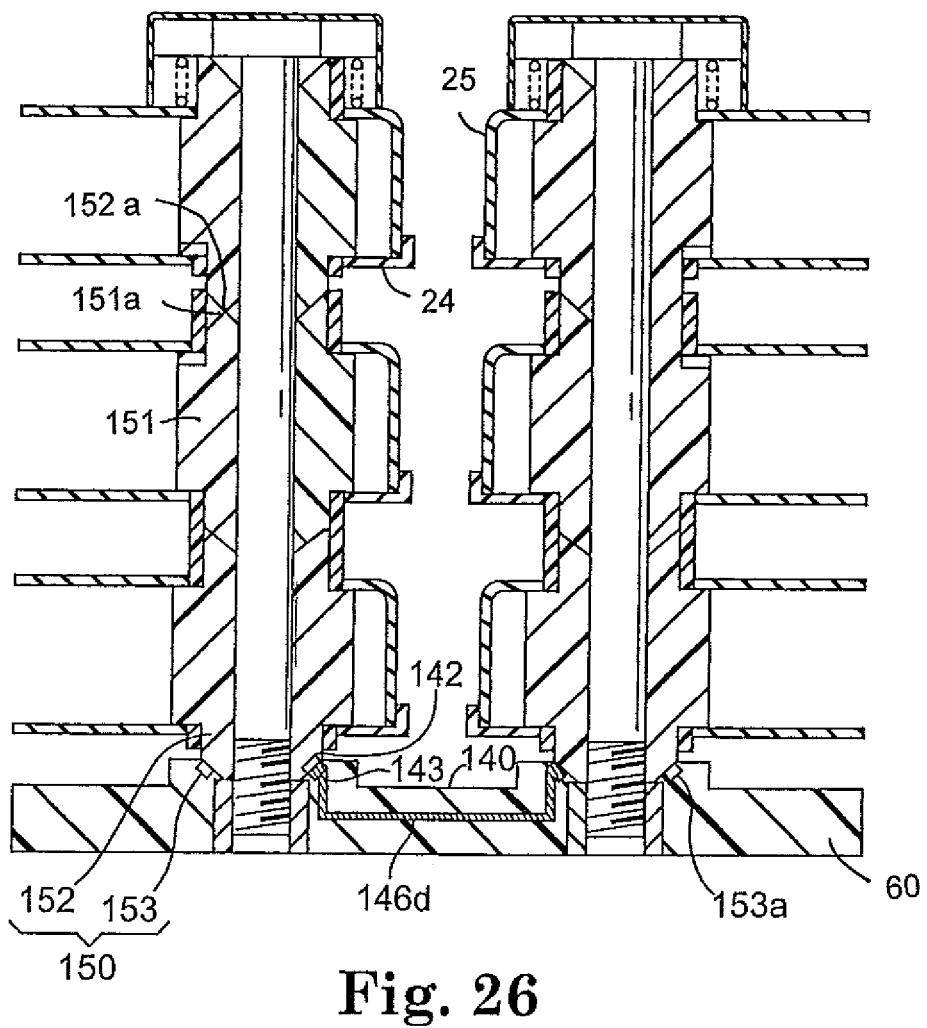
FIG. 26 is a cross section view along the 26-26 line in FIG. 24.
Figure 27:
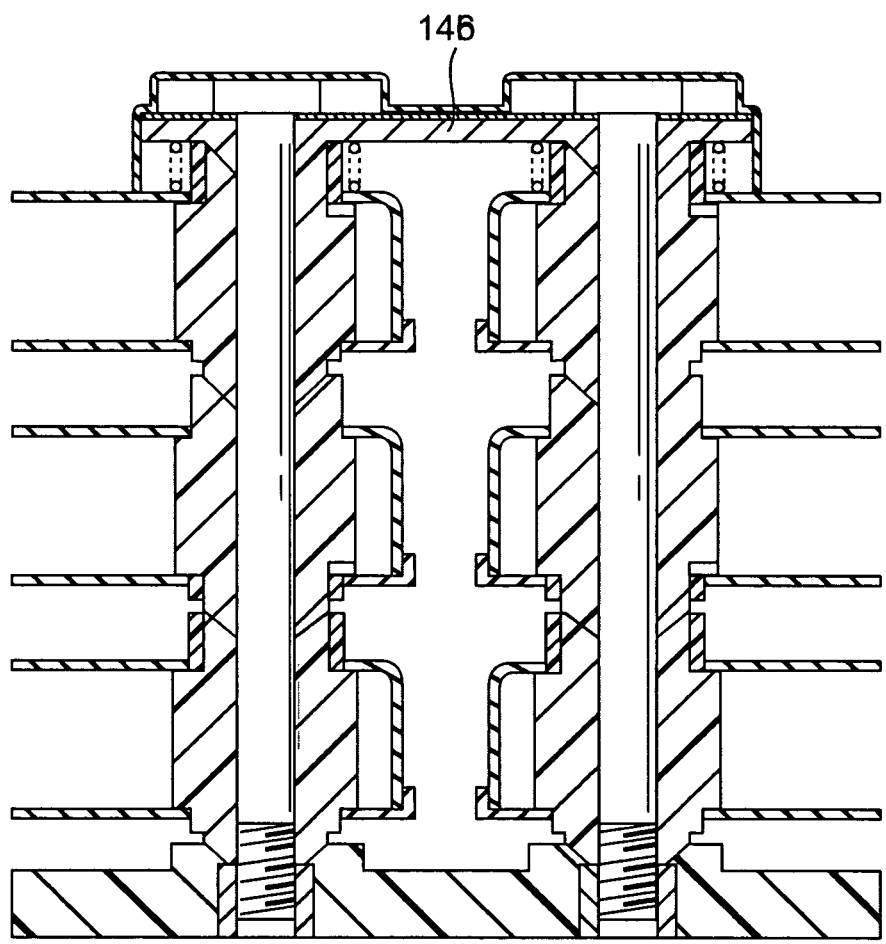
FIG. 27 is a cross section view along the 27-27 line in FIG. 24.
Figure 28:
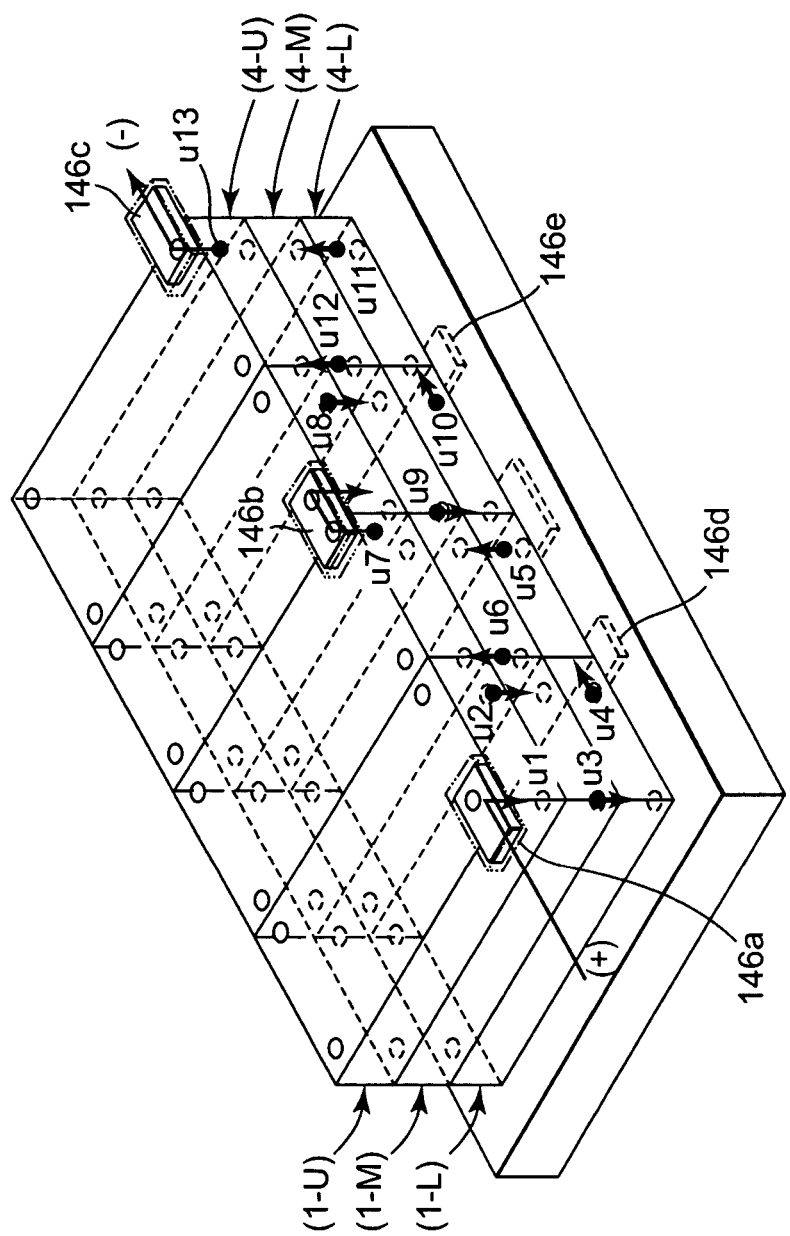
FIG. 28 is a perspective view conceptually illustrating an electrically connected state of an assembled battery.
Figure 29:
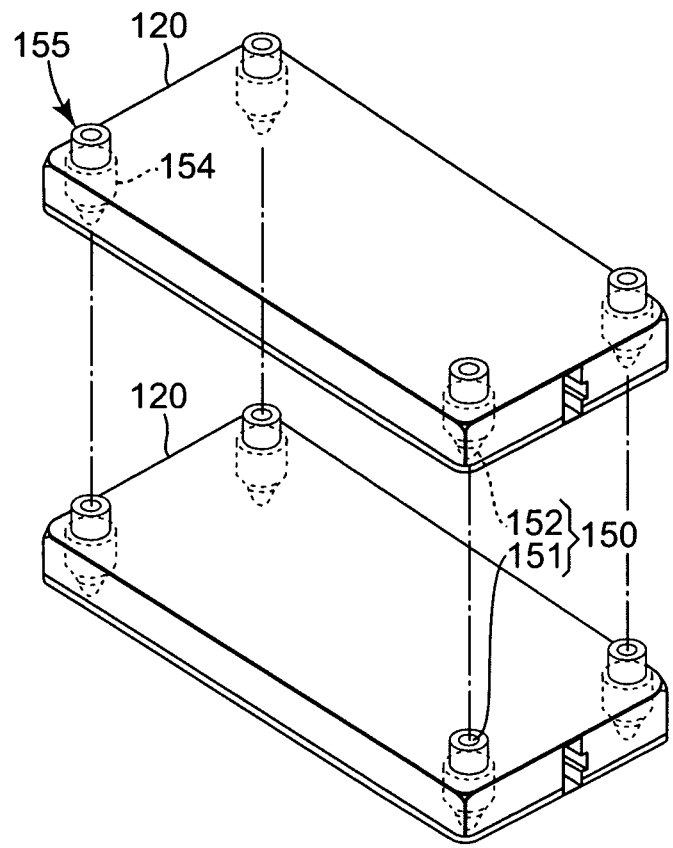
FIG. 29 is a perspective view illustrating one example of a battery module of an assembled battery.
Figure 30:
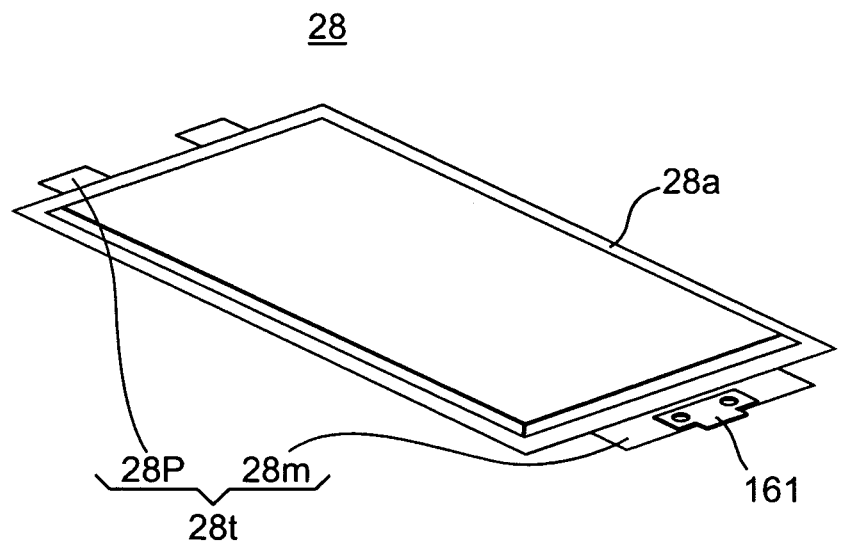
FIG. 30 is a perspective view illustrating one example of a flat type battery of a battery module.
Figure 33:
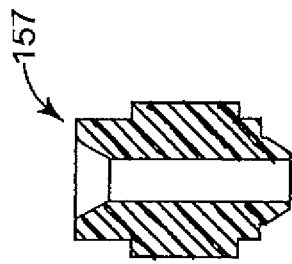
FIG. 33 is a cross section illustrating the insulation sleeve without the conductive collar and terminal.
Figure 32A:
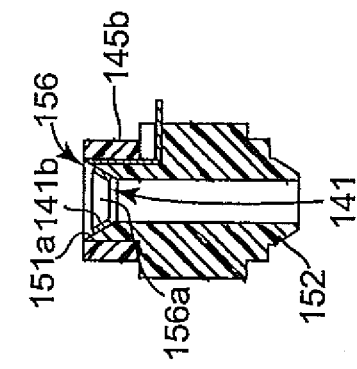
FIG. 32A is a cross section drawing illustrating an insulation sleeve equipped with a conductive collar and a terminal.
Figure 32B:
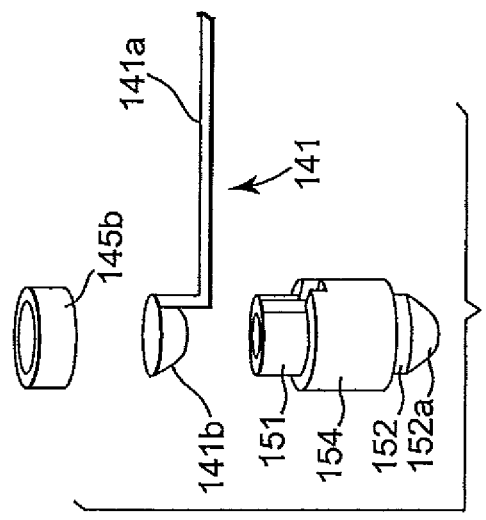
FIG. 32B is a perspective view illustrating the insulation sleeve after removal of the conductive collar and the terminal.
Figure 31A:
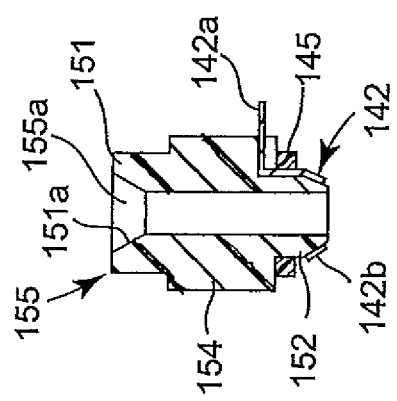
FIG. 31A is a cross-section drawing illustrating an insulation sleeve equipped with a conductive collar and a terminal.
Figure 31B:
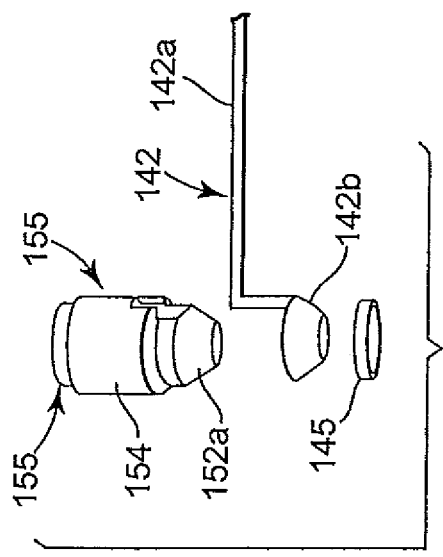
FIG. 31B is a perspective view illustrating the insulation sleeve after removal of the conductive collar and the terminal.
Figure 34A:
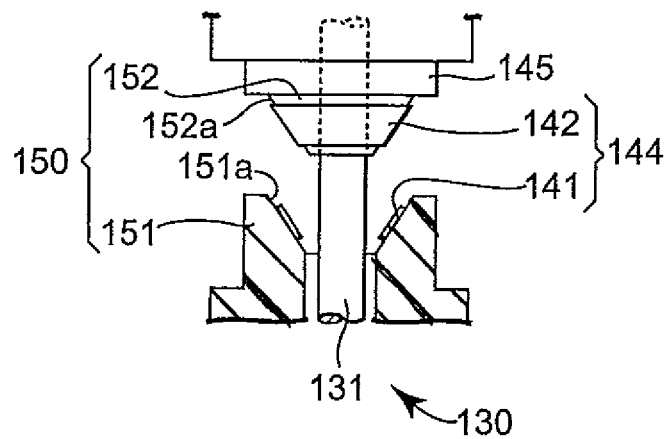
FIGS. 34A and 34B are cross-section illustrations of a battery module assembly.
Figure 34B:
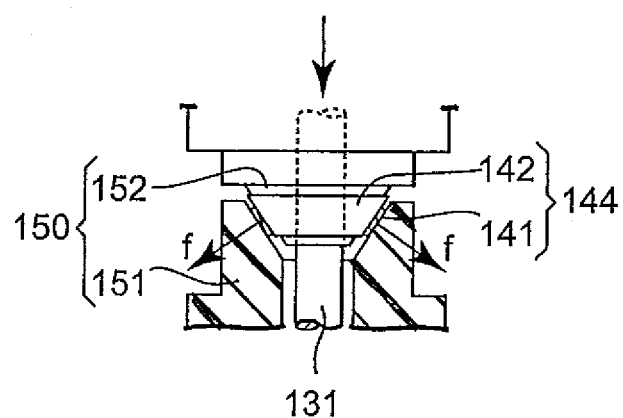
Figure 35:
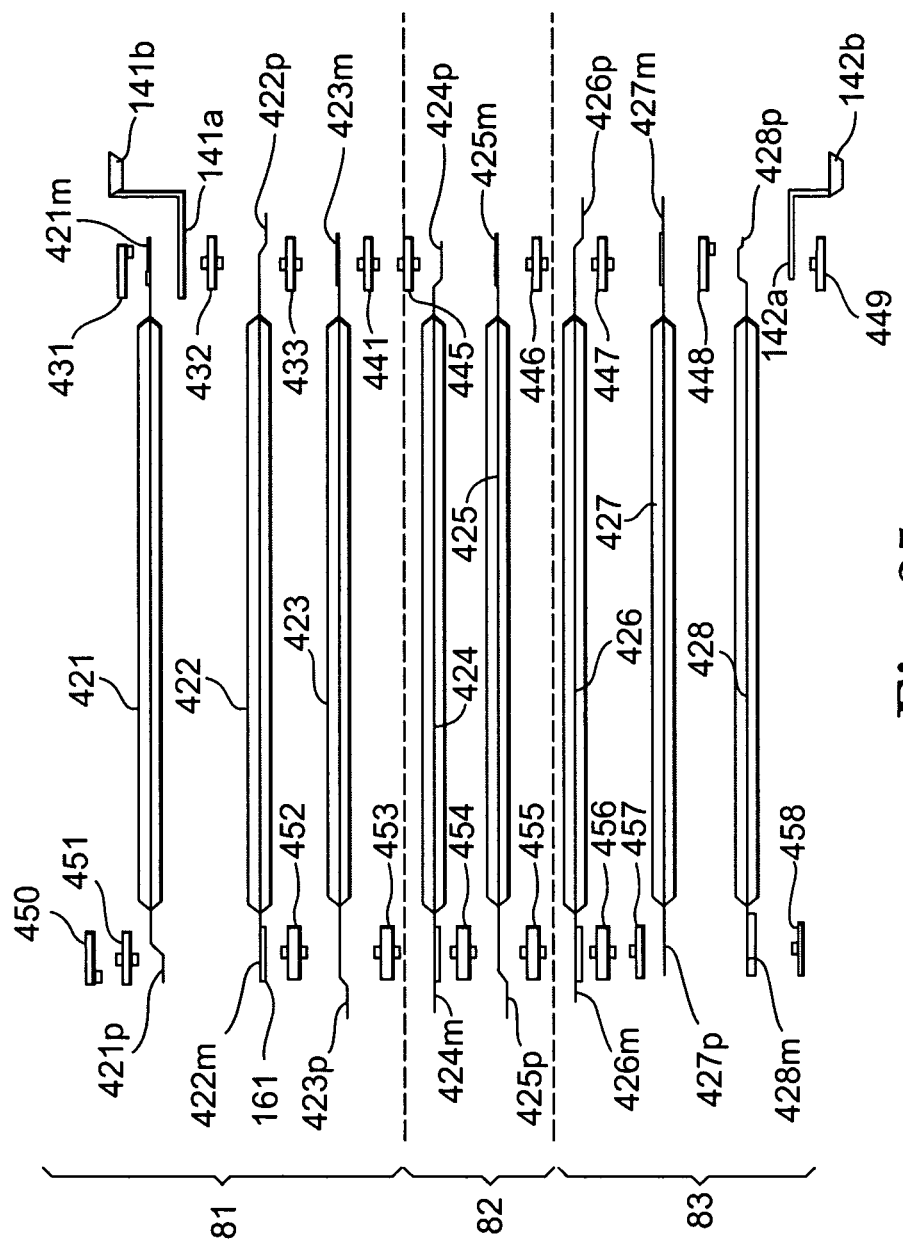
FIG. 35 is a conceptual view of layering the flat-type batteries and spacers in a battery module.
Figure 36:
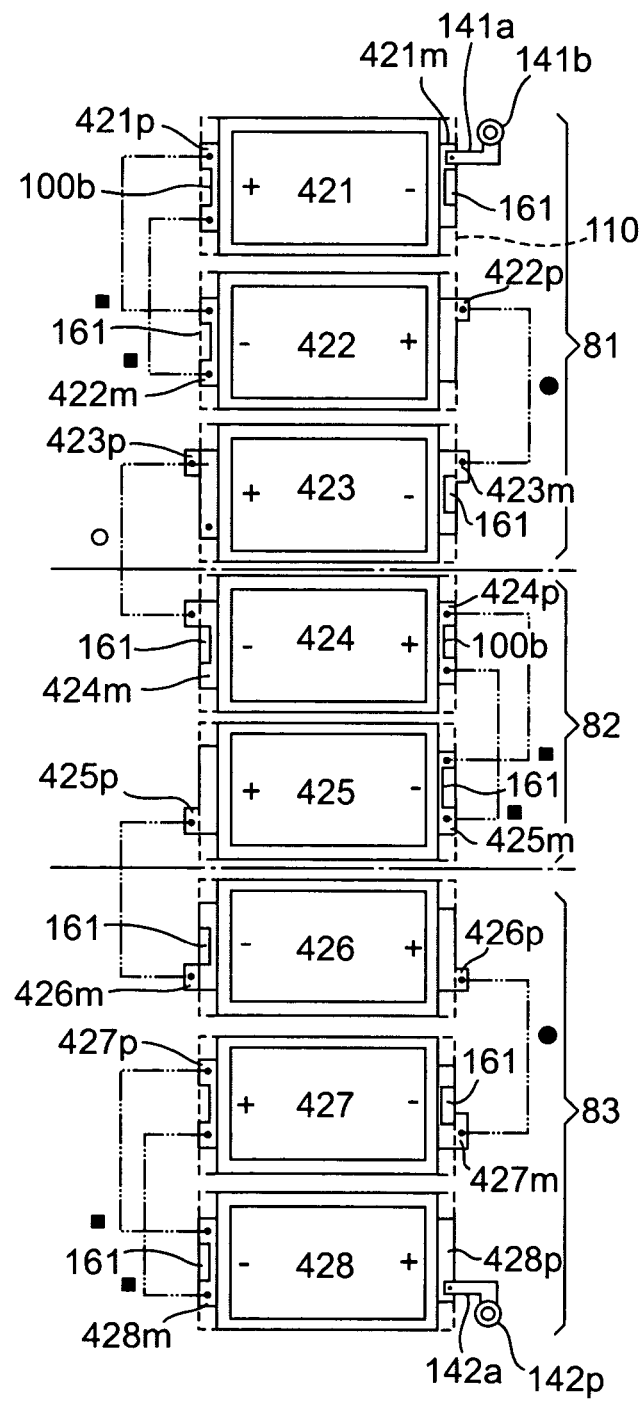
FIG. 36 is a conceptual view of electrical connections of the flat-type batteries in a battery module.
Figure 37:
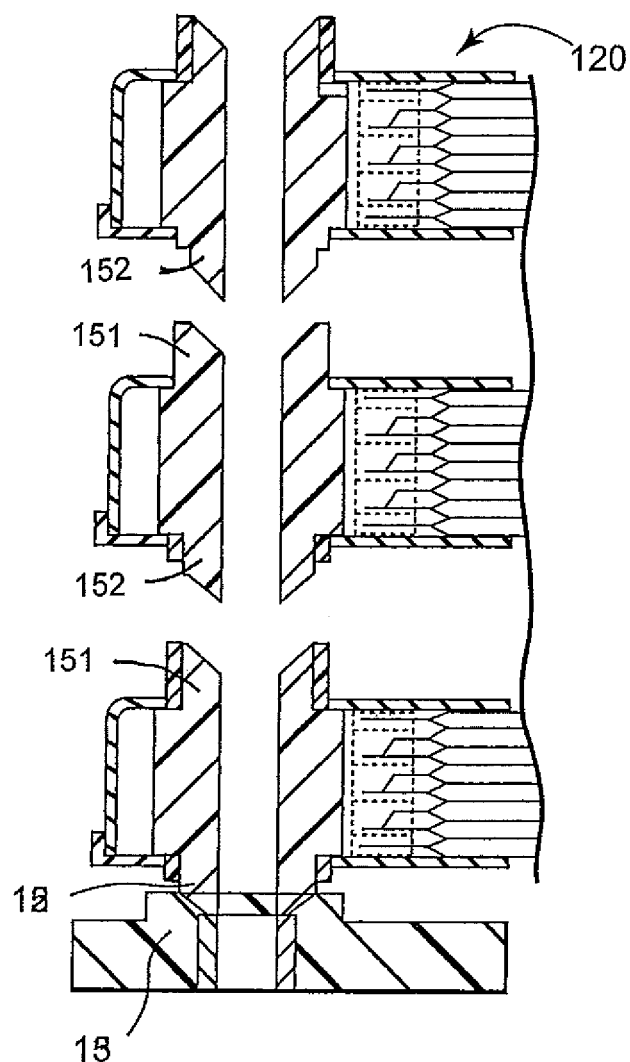
FIGS. 37-38 are schematic process charts illustrating the production of an assembled battery.
Figure 38:
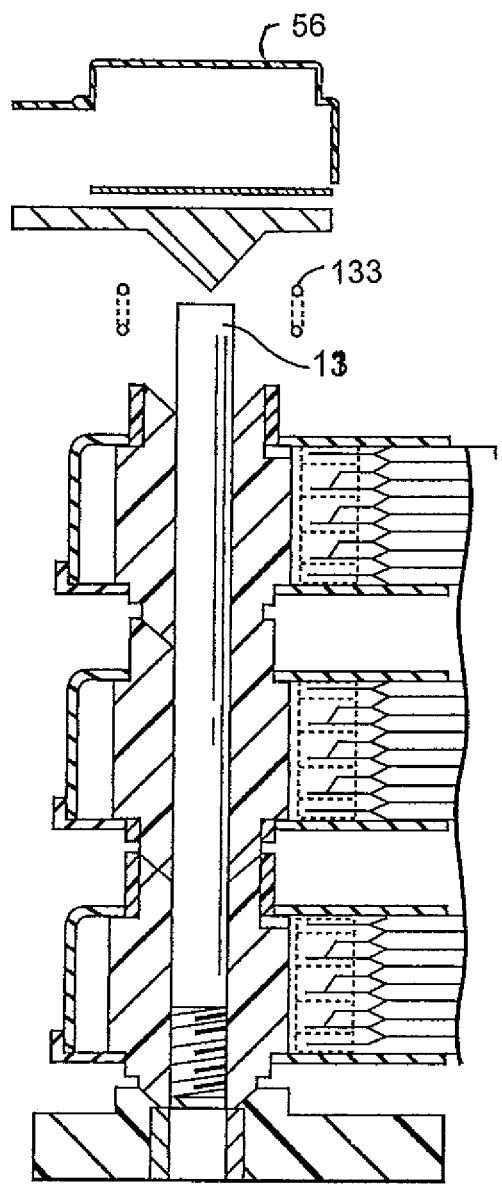
Figure 39:
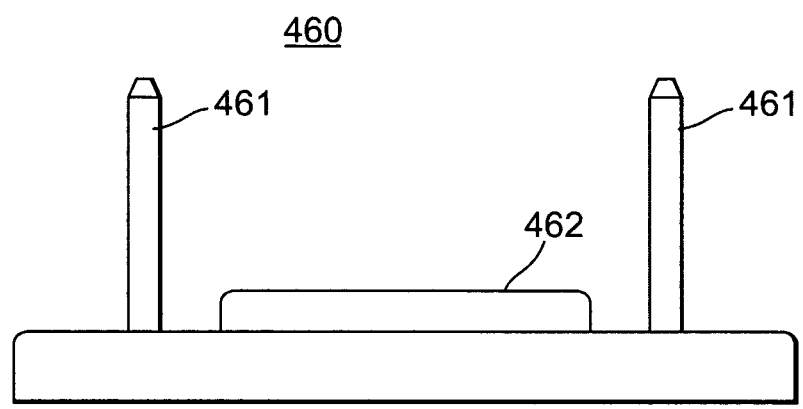
FIG. 39 is a perspective view illustrating an assembling jig to produce a battery module.

FIG. 24 is a perspective view illustrating an assembled battery 110 related to embodiment 3 of the present invention. FIG. 25 is a cross-section view along the 25-25 line in FIG. 24, FIG. 26 is a cross section view along the 26-26 line in FIG. 24, and FIG. 27 is a cross section view along the 27-27 line in FIG. 24. FIG. 28 is a perspective view conceptually illustrating an electrically connected state of an assembled battery 110. FIG. 29 is a perspective view illustrating an example of a battery module 120 of an assembled battery 10. FIG. 30 is a perspective view illustrating an example of a flat type battery 28 accommodated in a battery module 120. FIG. 31A is a cross-section view illustrating insulation sleeve 155 equipped with conductive collar 142b and terminal 142a. FIG. 31B is a perspective view illustrating insulation sleeve 155 after removal of conductive collar 142b and terminal 142a. FIG. 32A is a cross-section view illustrating insulation sleeve 156 equipped with conductive collar 141b and terminal 141a, and FIG. 32B is a cross section view illustrating insulation sleeve 156 after removal of conductive collar 141b and terminal 141a. FIG. 33 is a cross section illustrating insulation sleeve 157 without conductive collar and terminal, and FIGS. 34A and 34B are cross-sections that show the function of the elements of the assembled battery. FIG. 35 is a conceptual view of the flat-type batteries and spacers in a battery module 120. FIG. 36 is a conceptual view of the flat-type battery in a battery module 120. FIGS. 37 and 38 are schematic process charts illustrating the production process of an assembled battery 110. FIG. 39 is a perspective view illustrating an assembling jig to produce a battery module 120. FIGS. 40 and 41 are schematic process charts illustrating the production process of a battery module 120. Identical numerals are attached to the identical members as those in embodiment 1 described above, and the corresponding explanations are partially omitted.

Referring to FIGS. 25-27, a battery module 120 in embodiment 3 has, in the same way as in the battery module 20 in embodiment 1, a battery 28, a module case 23 accommodating the battery 28 where a through-bolt 131 is inserted, a conductive collar or plate 142b and 141b placed around the through-bolt 131 coaxially as well as electrically connected to external terminals 146a-146d or other battery modules 120, and a terminal or terminal board 142a and 141a that is placed around the conductive collar 142b and 141b and electrically connects the flat type battery 28 to the conductive collar 142b and 141b.

Referring also to FIGS. 31A-32B, the battery module 120 is equipped with sleeves 155 and 156 placed around the through-bolt 131 coaxially. In the insulation sleeve 156, concavity 156a is shaped where conductive collars 141b can mate to the surface. In the inner wall of concavity 156a, an inclined surface is formed where collars 141b are in the battery modules. The insulation sleeves 155 and 156 are inserted through module housing 23, and the first 151 and second 152 ends, or spacers, of insulation sleeve 155 and 156 are extended outside of housing 23. The first end (first spacer 151) has inclined surfaces 155a and 156a, and the second end (the second spacer 152) is shaped into a tapered surface. Embodiment 3 is different from the assembled battery 10 in embodiment 1 in that an electrically insulated connection part 150 is provided, resulting in more than one of battery modules 120 stacked in layers with intervening spaces S therebetween.

The through-bolt 131 is inserted into each of three battery modules 120 in a direction parallel to the battery modules 120 stacked in layers (vertical direction in FIG. 25) through a through-bolt hole 27. In embodiment 3, the through-bolt 131 is not used as a member to establish electrical connections. Therefore, the material of the through-bolt 131 may be either electrically conductive or electrically insulated. The battery module groups 120a are mounted on a bottom housing 60. The bottom housing 60 is made from an electrically insulated resin material. On the bottom housing 60, corresponding to the locations of the bolt holes 27, nuts 132, into which the screw part 131a of the tip of a through-bolt 131 is to be screwed, are inserted. Between the head of the through-bolt 131 and the battery module 120 of the uppermost level, a spring 133 is provided to provide a bias force to hold down the battery module group 120a.

By screwing the screw part 131a of the through-bolt 131 into the nut 132, a plurality of battery modules 120 are tightened and compressed to ensure the state of being stacked in layers is applied by the axial force of the through-bolt 131. Furthermore, as the resilient force of the compressed spring 133 has been biased for a plurality of battery modules 120, the stacked and layered state may be maintained for a long period of time.

Connection part 150 includes a first spacer 151 on the first end protruding from a module housing 23 in the upward direction in FIG. 25 parallel to the stacking and layering direction, a second spacer 152 on the second end protruding from the module housing 23 in the opposite direction (downward direction in FIG. 25) parallel to the stacking and layering direction, and a housing side spacer 153 protruding from the bottom housing 60 toward a battery module group 120a.

The first and second spacers 151 and 152, together with a hollow cylindrically shaped sleeve body 154, comprise a sleeve 155, 156 and 157 (see FIGS. 31A-33). The first spacer 151 is integrally formed at the upper edge of the sleeve body 154, whereas the second spacer 152 is integrally formed at the lower edge of the sleeve body 154. The first spacer 151 protrudes from a bolt hole 27 formed in a first housing 24, and the second spacer 152 protrudes from a bolt hole 27 formed in the second housing 25. The sleeves 155, 156 and 157 are made from electrically insulated materials such as resin materials.

The first spacer 151 is provided with a tapered dent into which the tip of the tapered second spacer 152 is fitted and engages with the second spacer 152 by the projections and recesses. Both the first and second spacers 151 and 152 have an inclined surface that directly contacts the other, 151a and 152a, respectively. As the first spacer 151 engages with the second spacer 152 by projections and recesses, accordingly, paired battery modules 120 adjacent to each other and parallel to the stacking and layering direction are stacked in layers with an intervening space S there between.

The housing side spacer 153 is also provided with a tapered dent into which the tip of the tapered surface of second spacer 152 is fitted and engages with the second spacer 152 by the projections and recesses. Both the housing side spacer 153 and the second spacer 152 have an inclined surface directly contacting the other, 153a and 152a, respectively. As the housing side spacer 153 engages with the second spacer 152 by projections and recesses, accordingly, the battery modules 120 of the lowest level and the bottom housing 60 are stacked in layers with an intervening space S there between.

The connection parts 150 (between the first spacer 151 and the second spacer 152, or the housing side spacer 153 and the second spacer 152) are connected to each other through inclined surfaces 151a, 152a and 153a, thus allowing positioning between the connection parts 150 to be easily conducted. As a result, the positioning between paired battery modules 120 adjacent to each other parallel to the stacking and layering direction and between battery modules 120 of the lowest level and the bottom housing 60 can be easily conducted.

Each space S is used as a cooling air passage for cooling air to flow down to cool each battery module 120. By cooling each battery module 120 with cooling air flow, the temperature of the battery decreases, thus preventing charge efficiency from being reduced.

Electrical connecting means consists of output terminals 144 located in the connection parts 150. By connecting the connection parts 150 to each other by the axial force of through-bolts 131, electrical connections are established through the output terminals 144 that are pressed against each other. Since a bus bar function to establish electrical connections is integrated to the connection parts 150 by which a space S is created, the number of parts can be reduced while reducing the resources required for assembly.

Each output terminal 144 is located on the inclined surfaces 151*a*, 152*a* and 153*a* of the connection parts 150. More specifically, an output terminal 144 includes a first output terminal 141 to be located on the inclined surface 151*a* of the first spacer 151, a second output terminal 142 to be located on the inclined surface 152*a* of the second spacer 152, and a housing side output terminal 143 to be located on the inclined surface 153*a* of the housing side spacer 153. Each output terminal 144 is made from electrically conductive material such as metallic materials.

As illustrated in FIGS. 31A and 31B, the second output terminal 142 has plate 142*b* that works as a conductive collar placed on the inclined surface 152*a* of the second spacer 152 of the insulation sleeve 155. Terminal board 142*a*, which is equivalent to a terminal, is connected integrally to the plate 142*b*. The plate 142*b* is shaped to match the shape of the second spacer 152 and is attached to the second spacer 152 with an electrically insulated retaining ring 145. The terminal board 142*a* extends into the module housing 23, connecting to a tab of the battery 28. The surface of the second output terminal 142 is exposed onto the inclined surface 152*a*.

As illustrated in FIGS. 32A and 32B, the first output terminal 141 has plate 141*b* that works as a conductive collar placed on the inclined surface 151*a* of the first spacer 151 of the insulation sleeve 156. Terminal board 141*a*, which is equivalent to a terminal, is connected integrally to the plate 141*b*. The plate 141*b* is shaped to match the shape of the first spacer 151 and is attached to the first spacer 151 with an electrically insulated retaining ring 145*b*. The terminal board 141*a* extends into the module housing 23, connecting to a tab of the battery 28. The surface of the first output terminal 141 is exposed onto the inclined surface 151*a*.

As illustrated in FIG. 26, the housing side output terminal 143 is inserted into the housing side spacer 153. The surface of the housing side output terminal 143 is exposed onto the inclined surface 153*a*.

Referring to FIGS. 35 and 36, a cell unit in a battery module includes eight batteries 421-428 and insulation spacers 431-458 to secure tabs. For convenience of illustration, the eight batteries are referred to as the first battery 421 through the eighth battery 428 from top to bottom along battery layer direction (vertical direction in FIG. 35). In FIG. 36, spacers 431-458 are shown as broken lines.

Cell units are composed of three subassemblies; the first subassembly 81, the second subassembly 82 and the third subassembly 83. In FIG. 35, the first subassembly 81 consists of three batteries 421, 422 and 423 layered and connected to each other in series. The second subassembly 82 consists of two batteries 424 and 425 layered and connected to each other in series. The third subassembly 83 consists of three batteries 426, 427 and 428 layered and connected to each other in series. The first subassembly 81 has a terminal 141*a* integrated in the anode conductive collar 141*b*, and the third subassembly 83 has a terminal 142*a* integrated in the cathode conductive collar 142*b*. The first subassembly 81 and the second subassembly 82 are connected electrically by connecting tabs 423*p* and 424*m* to each other facing outside of the spacers. The second subassembly 82 and the third subassembly 83 are connected electrically by connecting tabs 425*p* and 426*m* to each other facing outside of the spacers. The battery 423 of the first subassembly 81 and the battery 424 of the second subassembly 82 are adhered to each other by double-sided adhesive tape. The battery 425 of the second subassembly 82 and the battery 426 of the third subassembly 83 are adhered to each other by double-sided adhesive tape.

Each of spacers 431-458 has a board shape to hold a tab from both sides along the battery layering direction and is electrically insulative. Spacers 431-458 have an opening window so as to bond the held tabs to each other by ultrasonic welding.

The anode terminal 141*a* is bonded to anode tab 421*m* of the first battery 421 by ultrasonic welding. The cathode terminal 142*a* is bonded to cathode tab 428*p* of the eighth battery 428 by ultrasonic welding. In the cell unit shown in FIG. 35, terminals are placed on the same edge in the lengthwise direction.

Referring to FIG. 36, there are various shapes of tabs. The tab shape is determined to facilitate tab bonding at subassemblies 81, 82 and 83, tab bonding between subassemblies 81, 82 and 83, and bonding between the terminals 141*a* and 142*a* and the tabs.

In FIG. 36, the tabs connected electrically are represented by two-dot broken lines. "Black squares" next to the connection lines represent bonding of tabs by ultrasonic welding at openings of spacers 431-458 in the first, the second and the third subassemblies 81, 82 and 83. "Black circles" next to the connection lines represent bonding of tabs that are facing outside by ultrasonic welding outside of spacers 431-458 in the first and the third subassemblies 81 and 83. "White circles" next to the connection lines represent bonding of tabs that are facing outside by ultrasonic welding outside of spacers 431-458 when subassemblies 81 and 82, as well as 82 and 83, are being connected after assembling of the first, the second and the third subassemblies 81, 82 and 83.

Before welding tabs, the anode terminal 141*a* is welded to the anode tab 421*m* of the first battery 421, and the cathode terminal 142*a* is welded to the cathode tab 428*p* of the eighth battery 428. The order of welding of tabs starts in the first subassembly 81, where the cathode tab 421*p* of the first battery 421 is welded to the anode tab 422*m* of the second battery 422. Then the cathode tab 422*p* of the second battery 422 is welded to the anode tab 423*m* of the third battery 423. In the second subassembly 82, the cathode tab 424*p* of the fourth battery 424 is welded to the anode tab 425*m* of the fifth battery 425. In the third subassembly 83, the cathode tab 427*p* of the seventh battery 427 is welded to the anode tab 428*m* of the eighth battery 428, and then the cathode tab 426*p* of the sixth battery 426 is welded to the anode tab 427*m* of the seventh battery 427. Next, the cathode tab 425*p* of the fifth battery 425 in the second subassembly 82 is welded to the anode tab 426*m* of the sixth battery 426 in the third subassembly 83, and the cathode tab 423*p* of the third battery 423 in the first subassembly 81 is welded to the anode tab 424*m* of the fourth battery 424 in the second subassembly 82. With the process above, the layered eight batteries 421-428 are connected in series by electrically connecting opposite electrode tabs to each other, and the anode terminal 141*a* and cathode terminal 142b are connected to the first battery 421 and the eighth battery 428, respectively, which are positioned at the each end along the layering direction.

The assembled battery 110 in embodiment 3 is comprised of more than one of battery modules 120 of the above-mentioned structure. Briefly, in the assembled battery 110, two battery modules 120 next to each other are locked by a through-bolt 131 inserted into the battery modules 120, while the insulation sleeves 155 and 156 of each battery module 120 are in contact with each other. At the same time, the batteries 28 of these battery modules 120 are connected electrically through conductive collars 142b and 141b. The insulation sleeves 155 and 156 are inserted through module housing 23, and both ends of the insulation sleeve 155 and 156 are extended outside of the module housing 23. One projection of the first end (the first spacer 151) has concavity 155a or 156a, and the projection at the second end (the second spacer 152) has a tapered shape. The concavity 156a of the insulation sleeve 156 on one battery module 120 out of two battery modules is engaged with the tapered projection (the second spacer 152) of the insulation sleeve 155 on the other battery module 120. An assembled battery 110 is described hereinafter.

Referring to FIG. 28, an electrically connected state of the assembled battery 110 is explained. Arrows u1-u13 in FIG. 28 each conceptually represents an electrically connected status established in the assembled battery 110. Arrow u1 connects between the cathode side external terminal board 146a and the cathode electrode tab 28p in the battery module (1-U). Arrow u2 connects between the anode electrode tab 28m in the battery module (1-U) and the cathode electrode tab 28p in the battery module (1-M). Arrow u3 connects between the anode electrode tab 28m in the battery module (1-M) and the cathode electrode tab 28p in the battery module (1-L). Arrow u4 connects between the anode electrode tab 28m in the battery module (1-L), the external terminal board 146d and the cathode electrode tab 28p in the adjacent battery module (2-L). Arrow u5 connects between the anode electrode tab 28m in the battery module (2-L) and the cathode electrode tab 28p in the battery module (2-M). Arrow u6 connects between the anode electrode tab 28m in the battery module (2-M) and the cathode electrode tab 28p in the battery module (2-U). Arrow u7 connects between the anode electrode tab 28m in the battery module (2-U), the external terminal board 146b and the cathode electrode tab 28p in the adjacent battery module (3-U). Arrow u8 connects between the anode electrode tab 28m in the battery module (3-U) and the cathode electrode tab 28p in the battery module (3-M). Arrow u9 connects between the anode electrode tab 28m in the battery module (3-M) and the cathode electrode tab 28p in the battery module (3-L). Arrow u10 connects between the anode electrode tab 28m in the battery module (3-L), the external terminal board 146e and the cathode electrode tab 28p in the adjacent battery module (4-L). Arrow u11 connects between the anode electrode tab 28m in the battery module (4-L) and the cathode electrode tab 28p in the battery module (4-M). Arrow u12 connects between the anode electrode tab 28m in the battery module (4-M) and the cathode electrode tab 28p in the battery module (4-U), and arrow u13 connects between the anode electrode tab 28m in the battery module (4-U) and the anode side external terminal board 146c.

FIG. 25 represents a state in which electrical connections between the uppermost level battery modules 120 and the positive side external terminal board 146a and between paired battery modules 120 of the lowest level and middle level are established. The cathode side external terminal board 146a is in contact with a plate 141b placed on the inclined surface 151a of the first spacer 151 of the insulation sleeve 156. The plate 141b is connected electrically to the cathode tab 28p of the battery 28 of the uppermost battery module 120 through the terminal board 141a.

Regarding the middle battery module 120, the plate 142b placed on the inclined surface 152a of the second spacer 152 of the insulation sleeve 155 is connected electrically to the cathode tab 28p of the battery 28 of the middle battery module 120 through the terminal board 142a. Regarding the lowest battery module 120, the plate 141b placed on the inclined surface 151a of the first spacer 151 of the insulation sleeve 156 is connected electrically to the cathode tab 28p of the battery 28 of the lowest battery module 120 through the terminal board 141a. As illustrated in FIG. 26, the external terminal board 146d is insert-molded on the bottom housing 60 to electrically connect the housing side output terminals 143 next to each other.

In addition, as shown in FIGS. 34A and 34B, once the first spacer 151 and the second spacer 152 are connected by the axial force of the through-bolt 131, the first output terminal 141 and the second output terminal 142 are pressed against each other. Through these output terminals 141 and 142, electrical connections between the battery modules 120 are established. Likewise, once the second spacer 152 and the housing side spacer 153 are connected by the axial force of the through-bolt 131, the second output terminal 142 and the housing side output terminal 143 are pressed against each other. Through these output terminals 142 and 143, electrical connections between the battery module 120 and the external terminal board 146d are established.

Each output terminal 144 is located on an inclined surface directly contacting the other surface 151a, 152a or 153a, respectively. Therefore, as indicated by arrows f in FIG. 34B, the axial force of the through-bolt 131 provides the force to the output terminals 144 (the first output terminal 141 and the external terminals, the first output terminal 141 and the second output terminal 142 and the second output terminal 142 and the housing side output terminal 143), thus ensuring the electrical connections between the output terminals 144. Moreover, by increasing the contact area between the output terminals 144, electrical resistance may be reduced.

In the illustrated example, an insulation sleeve 157 of FIG. 33 without an output terminal 144 equipped is placed where electrical connections are not established. For the purpose of reducing the number of parts, insulation sleeves 155 and 156 equipped with an output terminal 144 are replaced by insulation sleeve 157 when electrical connections are not required.

Referring to FIGS. 37, 38 and 25, the production process of the assembled battery 110 is described. A battery module group 120a in one row is described. Regarding the assembled battery 110, the first spacer 151 engages with the second spacer 152 with projections and recesses such that more than one of the battery modules 120 can be stacked in layers while determining the position without any exclusive jigs or other mounting devices.

As shown in FIG. 37, the housing side spacer 153 engages with the second spacer 152 by projections and recesses to position the lowest battery module 120. The first spacer 151 of the lowest battery module 120 engages with the second spacer 152 of the middle battery module 120 by projections and recesses, accordingly, to position the middle battery module 120. In the same way, the first spacer 151 of the middle battery module 120 engages with the second spacer 152 of the uppermost battery module 120 by projections and recesses to position the uppermost battery module 120. As shown in FIG. 38, through-bolts 131 are inserted through insulation sleeves 155 and 156.

As shown in FIG. 25, when the through-bolts 131 are tightened, more than one of the battery modules 120 are tightened and forced to secure the stacked state of the layers from the axial force of the through-bolt 131. After the tightening torque of the four through-bolts 131 are adjusted, and protection caps 56 are attached to each through-bolt 131, assembly of a battery module group 120a of one row is completed. When the above procedure is done on all of the other battery module groups 120a, the production process of the assembled battery 110 is completed.

Referring to FIGS. 39-41B, production process of the battery module 120 is described. As shown in FIG. 39, the production process of battery module 120 includes the use of an assembly jig 460 attached with four locate pins 461. The four locate pins 461 are installed at the same position as bolt holes 27 of the module housing 23. The outer diameter of the locate pin 461 is somewhat smaller than the inner diameter of the bolt hole 27. A protruded receptacle 462 is formed to hold the first housing 24 on the base plate of the assembly jig 460.

Figure 40A:
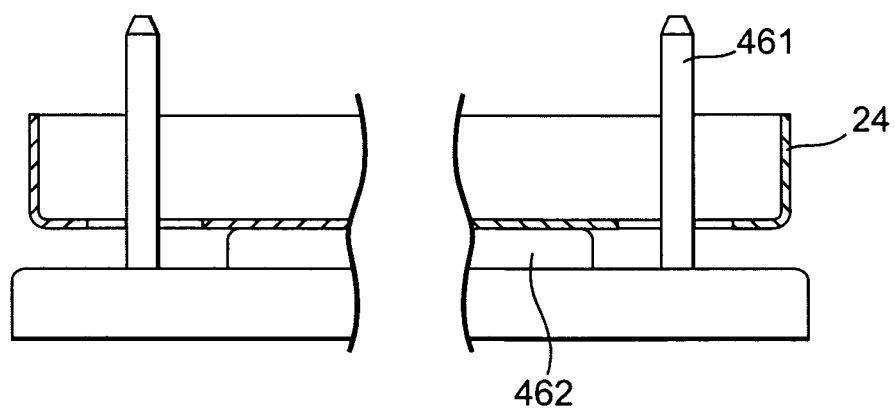
FIGS. 40-41 are schematic process charts illustrating the production of a battery module.
Figure 40B:
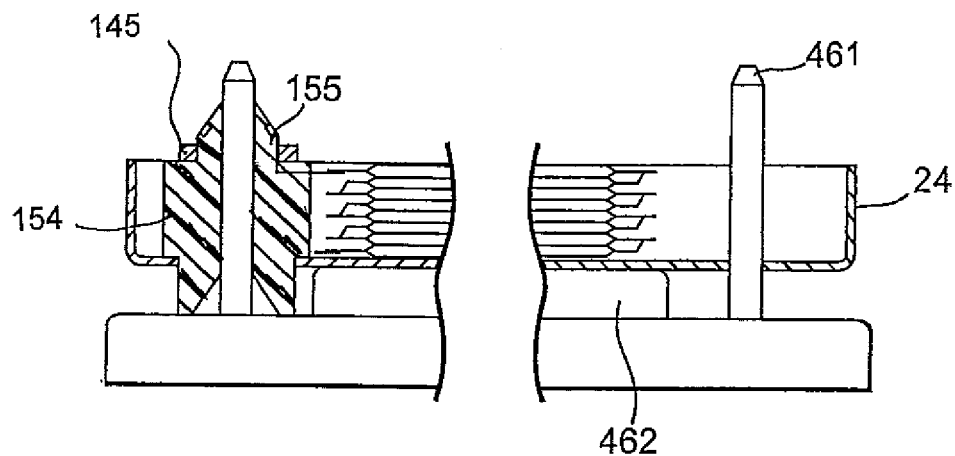
Figure 40C:
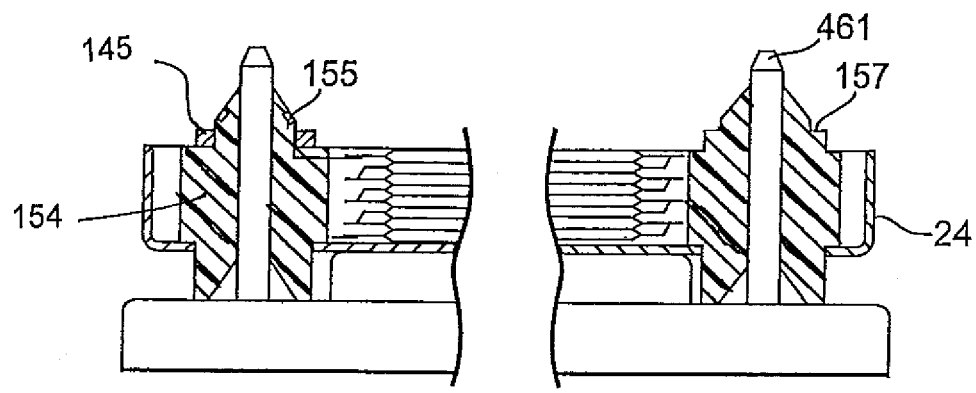

As shown in FIG. 40A, four bolt holes 27 of the first housing 24 are inserted into the four locate pins 461. As shown in FIG. 40B, a cell unit with adhesive applied on the top and bottom surfaces is set in the first housing 24. At the same time, two insulation sleeves 155 and 156 equipped with terminals that are integrated into the cell unit are inserted into two locate pins 461. One of the two insulation sleeves 155 and 156 equipped with a terminal is inserted into the locate pin 461 on the left front in FIG. 40B, and the other is inserted into the hidden locate pin 461 behind the right locate pin in FIG. 40B. In this way, the position of the cell unit is limited in accordance with the first housing 24. The sleeve body 154 and the retaining rings 145 and 145b are welded beforehand. As shown in FIG. 40C, two insulation sleeves 157 without terminals are inserted into the remaining two locate pins 461.

Figure 41A:
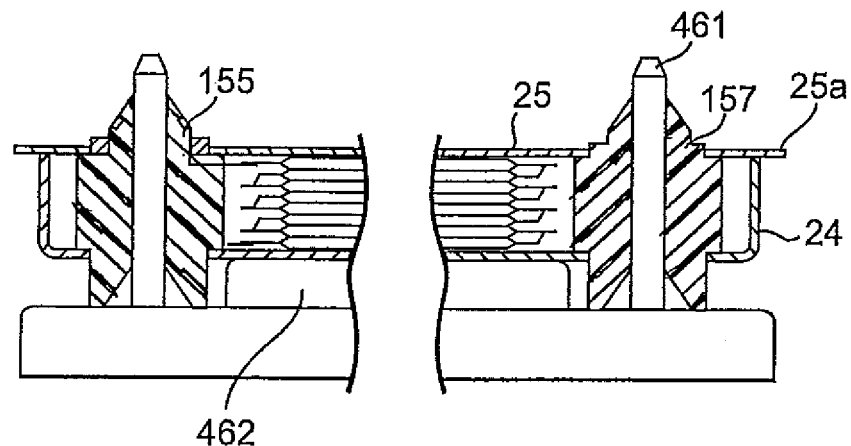
Figure 41B:
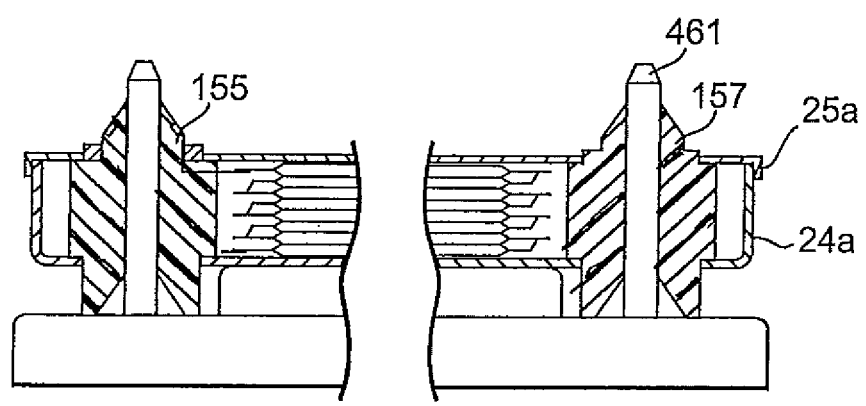

As shown in FIG. 41A, four bolt holes 27 of the second housing 25 are inserted into the four locate pins 461. As shown in FIG. 41B, the whole set including assembly jig 460 is thrown into a tightener. Through a caulking process, the edge 25a of the second housing 25 is tightened and wound around the edge 24b of the first housing 24. After this tightening procedure and pulling the battery module 120 out from the assembly jig 460, the production of the battery module 120 is completed.

As mentioned above, in the battery module 120 in embodiment 3, in the same way as in Embodiment 1, procedures to establish electrical connections in producing assembled batteries 110 can be simplified when compared to the case in which each bus bar has to be tightened by bolts.

The battery module 120 is equipped with sleeves 155 and 156 placed around the through-bolt 131 coaxially. In the insulation sleeve 156, concavity 156a is shaped where conductive collars 142b can fit into, and in the inner wall of concavity 156a, a slope 151a is formed where conductive collars 141b in the battery modules 120. In this way, battery modules 120 can be electrically connected easily each other.

The insulation sleeves 155 and 156 are inserted through module housing 23, and both ends, first and second ends, of each insulation sleeve 155 and 156 are extended outside of housing 23. The first end is concave shaped 155a and 156a, and the second end has a tapered shape. Since electrical connections are established through conductive collars 142b and 141b pressed against each other, secure electrical connections can be established by ensuring contact between the conductive collars 142b and 141b.

The assembled battery 110 in embodiment 3 consists of layers of more than one of battery modules 120 of the above-mentioned structure. Two battery modules 120 next to each other are locked by a through-bolt 31 inserted into the battery modules 120, while the insulation sleeves 155 and 156 of each battery module 120 are in contact with each other. At the same time, the batteries 28 of these battery modules 120 are connected electrically through a conductive collar 142b and 141b. As more than one of battery modules 120 are secured and electrical connections can be established by through-bolt 131, establishing electrical connections can be simplified compared to the case in which each bus bar has to be tightened by bolts.

Each connection part 150 has an inclined surface directly contacting the other of surfaces 151a, 152a and 153a, respectively. Since output terminals 144 are located on the inclined surfaces 151a, 152a and 153a, the contact between the output terminals 144 may become more secure.

Additionally, in embodiment 3, a through-bolt 131 does not establish electrical connections. Instead, through-bolt 131 is used to secure the state in which battery modules 120 are stacked in layers, and at the same time through-bolt 131 provides the bias force to ensure electrical connecting means. Thus, this embodiment is not limited to the case in which the through-bolt 131 may be inserted into the connection parts 150—the through-bolt 131 can be installed in locations different from the connection parts 150.

Figure 42A:
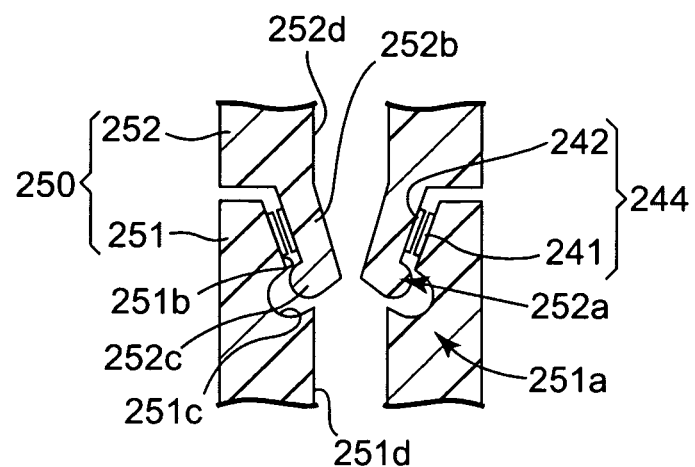
FIGS. 42A and 42B are illustrations of a connection part of an assembled battery related to embodiment 4.
Figure 42B:
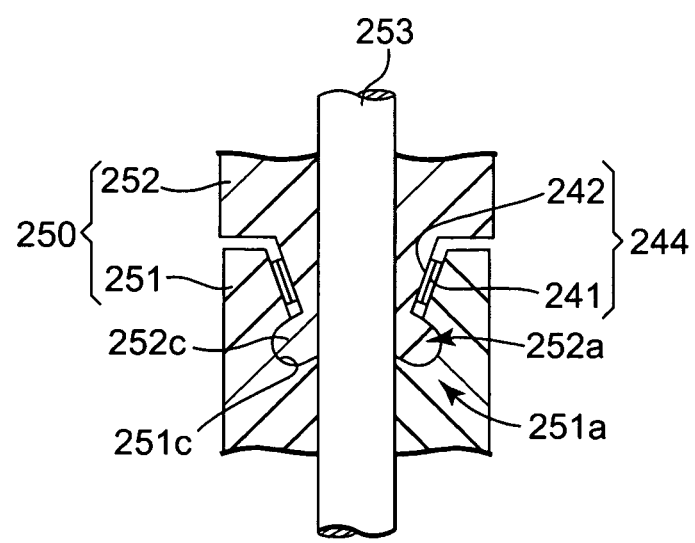

FIGS. 42A and 42B are drawings illustrating the operations of a connection part 250 of an assembled battery related to embodiment 4 of the present invention. In addition, the identical codes are used to explain the identical members as those in embodiment 3.

The assembled battery in embodiment 4, in the same way as the assembled battery 110 in embodiment 3, is provided with electrically insulated connection parts 250 to stack a plurality of battery modules 120 in layers with intervening spaces S therebetween. In contrast, the assembled battery in embodiment 4 is different from assembled batteries 10, 340 and 110 in embodiments 1-3, respectively, in that the securing means applies force to ensure the state of being stacked in layers by the engaging force of the engagement.

Referring to FIGS. 42A and 42B, a connection part 250, in the same way as those in embodiment 3, includes a first spacer 251 protruding from a module housing 23 in the upward direction in FIG. 42 parallel to the stacking and layering direction, and a second spacer 252 protruding from a module housing 23 in the opposite direction (downward direction in FIG. 42) parallel to the stacking and layering direction. As the first spacer 251 engages with the second spacer 252 by projections and recesses, accordingly, paired battery modules 120 adjacent to each other and parallel to the stacking and layering direction are stacked in layers with an intervening space S there between.

The first spacer 251 is provided with a dent into which the tip of the second spacer 252 is fitted and engages with the second spacer 252 by the projections and recesses. The first and second spacers 251 and 252, respectively, include engaging parts 251a and 252a, respectively, to be engaged to each other with shaft member 253. The engaging parts 251a and 252a are equivalents of securing means 230, and the engagement of both applies engaging force to ensure the state of being stacked in layers. In other words, the engaging part 252a of the second spacer 252 includes a tongue 252b extending downward, reducing the diameter, and a projection 252c protruding towards the outside in a radial direction is formed at the bottom end of the tongue 252b. Although not illustrated, a slit is formed on the tongue 252b in an appropriate position as necessary and is made such that it can be opened freely towards the outside in a radial direction. The engaging part 251a of the first spacer 251 includes an inclined surface 251b reducing the diameter in the downward direction. At the end of the inclined surface 251b in FIGS. 42A and 42B, a recess 251c (equivalent to concave ring) is formed for the projection 252c fit into.

When a rod 253, i.e. a shaft member, is being inserted into the center holes 251d and 252d of the first 251 and second 252 spacers, respectively, the tongue 252b opens toward the outside in a radial direction, and the projection 252c fits into the recess 251c. Thereby, engaging force is generated by the engagement, and force ensuring the state in which battery modules 120 are stacked in layers is applied. Herein, the rod 253 in embodiment 4 is neither a member to establish electrical connections nor a member to apply axial force to tighten the plurality of battery modules 120 stacked in layers. Instead, rod 253 is merely a member to open the tongue 252b. Therefore, the rod 253 may be any component that can be inserted or pressed into the center holes 251d and 252d. Furthermore, in order to prevent the rod 253 from coming off, the end of the rod 253 may be screwed into the bottom housing 60. However, also in this case, the rod 253 may not apply axial force to tighten the plurality of battery modules 120 stacked in layers. In some cases, some axial force may not be avoidable when securing rod 253.

Electrical connecting means consists of output terminals 244 located in the connection parts 250. The output terminal 244 includes a first output terminal 241 located on the inclined surface 251b of the first spacer 251 and a second output terminal 242 located on the outer circumference surface of the tongue 252b of the second spacer 252. Each output terminal 244 is made from electrically conductive material such as metallic materials. Although the illustration is omitted, each output terminal 244 is electrically connected to electrode tabs 28t of a battery 28 of paired battery modules 120.

As shown in FIG. 42B, when the connection is made between the first spacer 251 and the second spacer 252 by engaging force, the first output terminal 241 and the second output terminal 242 are pressed against each other. Accordingly, electrical connections are established between the battery modules 120 through these output terminals 244. Each output terminal 244 is arranged in an inclined manner to the opening direction of the tongue 252b. Therefore, the engaging force effectively acts as a pressing force between the output terminals 244, thus ensuring the electrical connections between the output terminals 244. Moreover, by increasing the contact area between the output terminals 244, electrical resistance can be reduced.

In addition, since a state in which a plurality of battery modules 120 are stacked in layers is ensured by the engaging force, the surface pressure of the contact between the output terminals 244 is not distributed depending on the locations of the stacked layers. Therefore, more even contact surface pressure may be generated in comparison to the securing case (embodiments 1-3) in which the axial force of the through-bolts 31 or 131 are applied.

Although the illustration is omitted, a housing side spacer that is the same as first spacer 251 is provided on the bottom housing 60, and is configured so as to be able to establish electrical connections between a battery module 120 and an external terminal board. As described above, since more than one of battery modules 120 are secured and electrical connections established at the same time, electrical connection establishment may be simplified when compared to the case in which each bus bar has to be tightened by bolts.

Furthermore, the embodiment may easily apply force to ensure a state of being stacked in layers by the engaging force of the engagement. The resulting contact force between the output terminals 244 may be equalized, regardless of the connecting locations.

Various embodiments of the invention have been described. These and other embodiments are within the scope of the following claims.

The invention claimed is:

1. A battery module comprising:
    a housing having a plurality of bolt holes and having an interior space;
    a plurality of batteries housed within the interior space, each battery comprising at least one unit cell, each unit cell including a cathode electrode, an anode electrode and a separator, the plurality of unit cells sealed by a sealing material, each battery having electrical terminals external of the sealing material, the electrical terminals including a cathode terminal and an anode terminal;
    a shaft member made of an electrically conductive material inserted through each of the plurality of bolt holes of the housing, the shaft member spaced apart from the plurality of batteries, the cathode terminals and the anode terminals;
    each shaft member having a conductive collar placed around the shaft member and electrically connected to the shaft member by contact with the shaft member; and
    each shaft member inserted through an output terminal, wherein the conductive collar is electrically connected to at least one of the electrical terminals of one of the plurality of batteries through an electrode part of the output terminal.

2. The battery module of claim 1, wherein the conductive collar is electrically connected to an external terminal of the battery module for electrical connection to a second battery module, the external terminal located outside of the housing.

3. The battery module of claim 2, wherein the conductive collar is electrically connected to the shaft member by contact therewith, and wherein the plurality of batteries are electrically connected to the external terminal and the second battery module through the conductive collar and the shaft member.

4. The battery module of claim 1, further comprising:
    an insulation sleeve positioned coaxially around the shaft member, and wherein:
    the output terminal contacts the insulation sleeve; and
    the plurality of batteries are electrically connected to at least one of an external terminal of the battery module and a second battery module through the conductive collar and output terminal, the external terminal located outside of the housing.

5. The battery module of claim 4, wherein a first end of the insulation sleeve includes one of a cylindrical indentation in an outer wall that fits into the bolt hole and a cylindrical indentation in an inner wall into which the output terminal fits, the cylindrical indentation including an inclined surface and the inclined surface inclined with respect to a longitudinal axis of the shaft member.

6. The battery module of claim 5, wherein both ends of the insulation sleeve extend through the bolt holes to an outside of the housing, and wherein a second end of the insulation sleeve opposite the first end comprises a tapered surface.

7. An assembled battery comprising:
    a plurality of battery modules, each battery module including:
        a housing having an interior space; and
        a plurality of batteries housed within the interior space, each battery comprising at least one unit cell, each unit cell including a cathode electrode, an anode electrode and a separator, the plurality of batteries sealed by a sealing material, each battery having electrical terminals external of the sealing material, the electrical terminals including a cathode terminal and an anode terminal;

a shaft member made of an electrically conductive material inserted through each housing in a stack direction of the plurality of battery modules, the shaft member spaced apart from the plurality of batteries and the electrical terminals;

a conductive collar placed around the shaft member and electrically connected to the shaft member by contact with the shaft member and associated with one of the plurality of battery modules, wherein the conductive collar contacts an output terminal through which the shaft member extends, the conductive collar electrically connected to the output terminal of the associated battery module.

8. The assembled battery of claim 7, wherein the plurality of battery modules comprises at least a first battery module and a second battery module and the conductive collar is electrically connected to an external terminal of the first battery module for electrical connection to the second battery module, the external terminal electrically coupled to one of the cathode terminal and the anode terminal of one of the plurality of batteries of the first battery module and the external terminal located outside of a housing of the first battery module.

9. The assembled battery of claim 7, wherein the plurality of battery modules are electrically connected through external terminals of each of the plurality of battery modules, each of the external terminals electrically coupled to one of a cathode terminal and an anode terminal of one of the plurality of batteries of each of the plurality of battery modules and each of the external terminals located outside of a respective housing of each of the plurality of battery modules.

10. The assembled battery of claim 7, wherein:
the plurality of battery modules comprises a first battery module and a second battery module;
the shaft member locks the first battery module and the second battery module together;
the conductive collar includes a first collar associated with the first battery module and electrically connected to at least one of the electrical terminals of the first battery module and includes a second collar associated with the second battery module, the second collar electrically connected to at least one of the electrical terminals of the second battery module; and
the shaft member electrically connects the first and second battery modules through the first and second collars.

11. The assembled battery of claim 10, further comprising:
at least one engagement member that locks the first battery module to the second battery module responsive to contact with the shaft.

12. The assembled battery of claim 7, further comprising:
a plurality of insulation sleeves positioned coaxially around the shaft member, each adjacent a respective one of the plurality of battery modules, and wherein:
the conductive collar contacts the output terminal in the insulation sleeve; and
one of the plurality of batteries of a first battery module is electrically connected to at least one of an external terminal of the first battery module and a second battery module through the conductive collar, the external terminal of the first battery module located outside of the housing of the first battery module and the external terminal of the second battery module located outside of the housing of the second battery module.

13. The assembled battery of claim 7, wherein the plurality of battery modules comprises at least a first battery module and a second battery module and the conductive collar is a first conductive collar adjacent to a first battery module, the assembled battery further comprising:
a plurality of insulation sleeves positioned coaxially around the shaft member and adjacent a respective one of the plurality of battery modules, and wherein:
a first end of each insulation sleeve includes a cylindrical indentation in an outer wall;
the cylindrical indentation forms an inclined surface inclined with respect to a longitudinal axis of the shaft member; and
an insulation sleeve of the first battery module fits into a conductive collar of the second battery module, the conductive collar of the second battery module placed around the shaft member adjacent to both the first conductive collar and the second battery module and electrically connected to at least one of the electrical terminals of the second battery module.

14. The assembled battery of claim 13, wherein:
the first end and a second end of each insulation sleeve extends outside of the housing;
the second end of each insulation sleeve comprises a tapered surface; and
the first end of an insulation sleeve of the second battery module accepts the second end of the insulation sleeve of the first battery module.

15. The assembled battery of claim 14, further comprising:
a retaining ring that contacts the inclined surface of the insulation sleeve of the second battery module, wherein the second end of the insulation sleeve of the first battery module contacts an inner surface of the retaining ring.

16. The assembled battery of claim 7 wherein the conductive collar comprises a deformed portion extending in a direction perpendicular to the stack direction and the deformed portion is electrically connected to the at least one of the electrical terminals of the one of the plurality of battery modules through the output terminal.

17. A method for assembly of an assembled battery comprising:
stacking a plurality of battery modules, each battery module including:
a housing having an interior space; and
a plurality of batteries housed within the interior space, each battery comprising at least one unit cell, each unit cell including a cathode electrode, an anode electrode and a separator, the plurality of batteries sealed by a sealing material, each battery having electrical terminals external of the sealing material, the electrical terminals including a cathode terminal and an anode terminal;
inserting a shaft member made of an electrically conductive material through each housing in a stack direction of the plurality of battery modules, the shaft member spaced apart from the plurality of batteries, the cathode terminals and the anode terminals; and
stacking one or more conductive collars such that each conductive collar is placed around the shaft member to be electrically connected to the shaft member by contact with the shaft member and is associated with one of the plurality of battery modules, wherein at least one conductive collar is electrically connected to one of the electrical terminals of the one of the plurality of batteries within the battery module with which it is associated through an output terminal having an electrode part that contacts the one of the electrical terminals.

18. The method of claim 17 further comprising:
electrically connecting the plurality of conductive collars to the shaft member, wherein each of the plurality of conductive collars is electrically connected to at least one of the electrical terminals of a respective one of the plurality of battery modules and to an external terminal for electrical connection to a different battery module.

19. The method of claim 17 further comprising:
deforming the at least one collar with force from the shaft member during insertion to electrically connect the one of the electrical terminals to the deformed collar.

20. The method of claim 17 further comprising:
inserting a plurality of insulation sleeves around the shaft member and adjacent to each of the plurality of battery modules, the plurality of insulation sleeves including at least a first insulation sleeve and a second insulation sleeve.

21. The method of claim 20, further comprising:
mating one of the plurality of conductive collars around a first end of the first insulation sleeve, wherein the first end forms a cylindrical indentation of an outer wall.

22. The method of claim 21, further comprising:
mating a tapered second end of the second insulation sleeve to an inclined surface of an inner wall of the first end of the first insulation sleeve.

23. The method of claim 17, further comprising:
locking the plurality of battery modules together with the shaft member.

24. The method of claim 23, wherein the shaft member electrically couples the plurality of battery modules together through the plurality of conductive collars.

25. The method of claim 23, further comprising:
deforming at least one of the plurality of conductive collars to electrically connect at least a first battery module and a second battery module through at least the deformed conductive collar.

26. The method of claim 23, further comprising:
inserting a retainer ring between an insulation sleeve of a first battery module and an insulation sleeve of a second battery module, wherein the retainer ring contacts an inclined surface of the insulation sleeve of the second battery module, and wherein an end of the insulation sleeve of the first battery module contacts an inner surface of the retainer ring.

27. The method of claim 23, wherein locking the plurality of battery modules together comprises mating at least one engagement part with the force of the shaft member.

* * * * *